(12) United States Patent
Waggoner

(10) Patent No.: US 11,827,003 B2
(45) Date of Patent: *Nov. 28, 2023

(54) RAPID SOLID-STATE FOAMING

(71) Applicant: Corumat, Inc., Pomona, CA (US)

(72) Inventor: Michael Waggoner, Seattle, WA (US)

(73) Assignee: Corumat, Inc., Mercer Island, WA (US)

(*) Notice: Subject to any disclaimer, the term of this patent is extended or adjusted under 35 U.S.C. 154(b) by 225 days.

This patent is subject to a terminal disclaimer.

(21) Appl. No.: 17/018,398

(22) Filed: Sep. 11, 2020

(65) Prior Publication Data

US 2021/0237395 A1 Aug. 5, 2021

Related U.S. Application Data

(63) Continuation-in-part of application No. 16/374,392, filed on Apr. 3, 2019, now abandoned, which is a
(Continued)

(51) Int. Cl.
*B32B 5/20* (2006.01)
*C08J 9/00* (2006.01)
(Continued)

(52) U.S. Cl.
CPC .............. *B32B 5/20* (2013.01); *B29C 44/02* (2013.01); *B32B 5/145* (2013.01); *B32B 27/065* (2013.01);
(Continued)

(58) Field of Classification Search
CPC ......... B32B 5/20; B32B 5/145; B32B 27/065; B32B 2262/067; B32B 2262/101;
(Continued)

(56) References Cited

U.S. PATENT DOCUMENTS 3,389,199 A 6/1968 Bushnell, Jr. et al.
3,651,183 A 3/1972 Hosoda et al.
(Continued)

FOREIGN PATENT DOCUMENTS

EP 3010700 A2 4/2016
EP 14 81 4566 2/2017
(Continued)

OTHER PUBLICATIONS

Pawar et al., American Journal of Engineering Research (AJER); e-ISSN : 2320-0847 p-ISSN : 2320-0936; vol. 2, Issue 5, pp. 151-164; www.AJER.us (Year: 2013).*
(Continued)

*Primary Examiner* — Allison G Fitzsimmons
(74) *Attorney, Agent, or Firm* — COOLEY LLP

(57) ABSTRACT

Disclosed, among other things, are ways to manufacture reduced density thermoplastics using rapid solid-state foaming and machines useful for the saturation of plastic. In one embodiment, a foaming process may involve saturating a semi-crystalline polymer such as Polylactic Acid (PLA) with high levels of gas, and then heating, which may produce a reduced density plastic having high levels of crystallinity. In another embodiment, a foaming process may produce layered structures in reduced density plastics with or without integral skins. In another embodiment, a foaming process may produce deep draw structures in reduced density plastics with or without integral skins. In yet another embodiment, a foaming process may utilize additives, blends, or fillers, for example. In yet another embodiment, a foaming process may involve saturating a semi-crystalline polymer such as Polylactic Acid (PLA) with high levels of gas, and then heating, which may produce a reduced density plastic having high levels of crystallinity.

15 Claims, 24 Drawing Sheets

Related U.S. Application Data continuation of application No. 14/930,592, filed on Nov. 2, 2015, now Pat. No. 10,322,561, application No. 17/018,398 is a continuation-in-part of application No. 14/930,610, filed on Nov. 2, 2015, now Pat. No. 10,800,136.

(60) Provisional application No. 62/073,872, filed on Oct. 31, 2014.

(51) Int. Cl.

| | | |
|---|---|---|
| *B32B 5/14* | (2006.01) | |
| *B32B 27/06* | (2006.01) | |
| *B65D 65/38* | (2006.01) | |
| *C08J 9/12* | (2006.01) | |
| *C08J 9/34* | (2006.01) | |
| *C08J 9/36* | (2006.01) | |
| *F16J 15/10* | (2006.01) | |
| *B29C 44/02* | (2006.01) | |
| *F16J 15/40* | (2006.01) | |
| *B29L 31/00* | (2006.01) | |
| *B29K 105/04* | (2006.01) | |
| *B29C 44/34* | (2006.01) | |
| *B29K 67/00* | (2006.01) | |

(52) U.S. Cl.
CPC ............ *B65D 65/38* (2013.01); *C08J 9/0061* (2013.01); *C08J 9/0066* (2013.01); *C08J 9/0085* (2013.01); *C08J 9/122* (2013.01); *C08J 9/34* (2013.01); *C08J 9/365* (2013.01); *F16J 15/102* (2013.01); *F16J 15/40* (2013.01); *B29C 44/3453* (2013.01); *B29K 2067/046* (2013.01); *B29K 2105/045* (2013.01); *B29K 2995/006* (2013.01); *B29L 2031/7132* (2013.01); *B32B 2262/067* (2013.01); *B32B 2262/101* (2013.01); *B32B 2266/0264* (2013.01); *B32B 2307/306* (2013.01); *B32B 2307/50* (2013.01); *B32B 2307/538* (2013.01); *B32B 2307/558* (2013.01); *B32B 2307/704* (2013.01); *B32B 2307/7163* (2013.01); *B32B 2307/72* (2013.01); *B32B 2307/7244* (2013.01); *B32B 2307/7246* (2013.01); *B32B 2307/75* (2013.01); *B32B 2435/02* (2013.01); *B32B 2439/00* (2013.01); *B32B 2439/70* (2013.01); *C08J 2201/032* (2013.01); *C08J 2203/06* (2013.01); *C08J 2205/044* (2013.01); *C08J 2205/048* (2013.01); *C08J 2300/16* (2013.01); *C08J 2367/04* (2013.01); *C08J 2367/06* (2013.01); *C08J 2400/16* (2013.01); *C08J 2403/02* (2013.01); *C08J 2467/02* (2013.01); *Y02W 90/10* (2015.05)

(58) Field of Classification Search
CPC ...... B32B 2266/0264; B32B 2307/306; B32B 2307/50; B32B 2307/538; B32B 2307/558; B32B 2307/704; B32B 2307/7163; C08J 9/00
See application file for complete search history.

(56) References Cited

U.S. PATENT DOCUMENTS

| | | | |
|---|---|---|---|
| 3,883,625 | A | 5/1975 | Thomas et al. |
| 4,455,272 | A | 6/1984 | Schubert et al. |
| 5,444,113 | A | 8/1995 | Sinclair et al. |
| 5,723,510 | A | 3/1998 | Nadella et al. |
| 5,866,053 | A | 2/1999 | Park et al. |
| 6,232,354 | B1 | 5/2001 | Tan |
| 7,501,175 | B2 | 3/2009 | Branch et al. |
| 7,670,545 | B2 | 3/2010 | Bopp et al. |
| 8,080,194 | B2 | 12/2011 | Nadella et al. |
| 8,377,548 | B2 | 2/2013 | Nadella et al. |
| 8,858,849 | B2 | 10/2014 | Nadella et al. |
| 8,877,331 | B2 | 11/2014 | Nadella et al. |
| 8,926,876 | B2 | 1/2015 | Kumar et al. |
| 9,770,854 | B2 | 9/2017 | Branch |
| 10,322,561 | B2 | 6/2019 | Waggoner |
| 10,513,590 | B2 | 12/2019 | Waggoner |
| 10,800,136 | B2 | 10/2020 | Waggoner |
| 11,661,491 | B2 | 5/2023 | Waggoner |
| 2005/0058824 | A1 | 3/2005 | Fujimoto |
| 2006/0091576 | A1 | 5/2006 | Takase et al. |
| 2007/0148384 | A1 | 6/2007 | Bowden et al. |
| 2007/0179253 | A1 | 8/2007 | Matsuoka et al. |
| 2009/0026198 | A1 | 1/2009 | Ichikawa et al. |
| 2009/0104420 | A1 | 4/2009 | Nadella et al. |
| 2009/0309250 | A1 | 12/2009 | Nadella et al. |
| 2010/0029793 | A1 | 2/2010 | Witt et al. |
| 2010/0052201 | A1 | 3/2010 | Nadella |
| 2010/0062235 | A1 | 3/2010 | Nadella et al. |
| 2010/0086758 | A1 | 4/2010 | Takase et al. |
| 2010/0136338 | A1 | 6/2010 | Hirai et al. |
| 2010/0297416 | A1 | 11/2010 | Kumar et al. |
| 2011/0003133 | A1 | 1/2011 | Kumar et al. |
| 2012/0225961 | A1 | 9/2012 | Van Horn et al. |
| 2013/0292305 | A1 | 11/2013 | Shelby et al. |
| 2013/0303643 | A1 | 11/2013 | Nadella et al. |
| 2013/0303645 | A1 | 11/2013 | Dix et al. |
| 2016/0045879 | A1 | 2/2016 | Kumar et al. |
| 2020/0023609 | A1 | 1/2020 | Waggoner |
| 2020/0325299 | A1 | 10/2020 | Waggoner |
| 2022/0073956 | A1 | 3/2022 | Waggoner et al. |
| 2022/0111570 | A1 | 4/2022 | Waggoner et al. |

FOREIGN PATENT DOCUMENTS

| | | |
|---|---|---|
| JP | H10-235668 A | 9/1998 |
| JP | 2004308077 A | 11/2004 |
| JP | 2006-044726 A | 2/2006 |
| WO | WO-0107166 A1 | 2/2001 |
| WO | WO-2008089358 A2 | 7/2008 |
| WO | WO 2014/205180 A3 | 12/2014 |
| WO | WO-2014205180 A2 | 12/2014 |
| WO | WO-2020198506 A1 | 10/2020 |
| WO | WO-2020198656 A2 | 10/2020 |

OTHER PUBLICATIONS

NatureWorks, Technology Focus Report: Polylactic Acid Containing Fillers and Fibers, 2007 (Year: 2007).*

Final Office Action dated Nov. 1, 2016 for U.S. Appl. No. 14/308,959, 13 pages.

Final Office Action dated Feb. 20, 2018 for U.S. Appl. No. 14/308,959, 15 pages.

Non-Final Office Action dated Feb. 16, 2016 for U.S. Appl. No. 14/308,959, 6 pages.

Non-Final Office Action dated Jun. 1, 2017 for U.S. Appl. No. 14/308,959, 14 pages.

Non-Final Office Action dated Oct. 18, 2018 for U.S. Appl. No. 14/308,959, 17 pages.

Non-Final Office Action dated Apr. 25, 2019 for U.S. Appl. No. 14/308,959, 18 pages.

Non-Final Office Action dated Aug. 7, 2018 for U.S. Appl. No. 14/930,592, 20 pages.

Third Party Submission Under 37 CFR 1.290 filed Apr. 12, 2018 for U.S. Appl. No. 14/930,592, 21 pages.

Non-Final Office Action dated Dec. 26, 2018 for U.S. Appl. No. 14/930,610, 12 pages.

Final Office Action dated Jun. 21, 2019 for U.S. Appl. No. 14/930,610, 18 pages.

Non-Final Office Action dated Dec. 2, 2019 for U.S. Appl. No. 14/930,610, 22 pages.

(56) References Cited

OTHER PUBLICATIONS

Non-Final Office Action dated Jan. 13, 2021 for U.S. Appl. No. 16/374,392, 22 pages.
Partial Supplementary European Search Report dated Jan. 25, 2017 for European Application No. 14814566.7, 8 pages.
Notice of Preliminary Rejection dated Jun. 25, 2020 for Korean Application No. 10-2015-7036342, with English translation, 5 pages.
Second Notice of Preliminary Rejection dated May 10, 2021 for Korean Application No. 10-2015-7036342, with English translation, 13 pages.
Cha, S. W., "A microcellular foaming/forming process performed at ambient temperature and a super-microcellular foaming process," Dissertation, Massachusetts Institute of Technology, Apr. 1994, 164 pages.
Materials Safety Data Sheet for Polylactic Acid; Jul. 7, 2008, 2 pages.
"The Ideal Gas Law" by University of Waterloo; accessed at http://www.science.uwaterloo.ca/~cchieh/cact/c120/idealgas.html via Wayback Machine; 2004, 1 page.
Wang, X. et al., "Development of Crystallization in PLA During Solid-State Foaming Process Using Sub-Critical $CO_2$," Cellular Polymers, vol. 31, No. 1, pp. 1-18 (2012).
Final Office Action, dated Sep. 22, 2022, for U.S. Appl. No. 16/673,368 (17 total pages).
International Preliminary Report on Patentability for Application No. PCT/US2020/025413, dated Oct. 7, 2021, 13 pages.
International Preliminary Report on Patentability for Application No. PCT/US2020/025011, dated Sep. 28, 2021, 7 pages.
International Preliminary Report on Patentability for Application No. PCT/US2014/043120, dated Dec. 22, 2015, 7 pages.
International Search Report and Written Opinion, dated Feb. 5, 2015, for International Application No. PCT/US2014/043120 (10 total pages).
International Search Report and Written Opinion, dated Jul. 20, 2020, for International Application No. PCT/US2020/025011 (9 total pages).
International Search Report and Written Opinion, dated Oct. 21, 2020, for International Application No. PCT/US2020/025413 (16 total pages).
Non-Final Office Action for U.S. Appl. No. 16/673,368, dated May 25, 2022, 15 pages.
Restriction Requirement, dated Aug. 31, 2018, for U.S. Appl. No. 14/930,610 (7 total pages).
Restriction Requirement, dated May 22, 2018, for U.S. Appl. No. 14/930,610 (6 total pages).
Restriction Requirement, dated Sep. 24, 2015, for U.S. Appl. No. 14/308,959 (8 total pages).
Restriction Requirement, dated Nov. 22, 2017, for U.S. Appl. No. 14/930,592 (7 total pages).
Non-Final Office Action for U.S. Appl. No. 17/480,674 dated May 9, 2023, 9 pages.
Restriction Requirement, dated Feb. 9, 2023, for U.S. Appl. No. 17/480,674 (9 total pages).
Yang, C., et al., "Merits of the Addition of PTFE Micropowder in Supercritical Carbon Dioxide Foaming of Polypropylene: Ultrahigh Cell Density, High Tensile Strength, and Good Sound Insulation," Ind. Eng. Chem. Res. 2018, 57, 1498-1505, DOI: 10.1021/acs.iecr.7b04644.

* cited by examiner

Reduced Density
Polymer Shape
2010

Reduced Density
Polymer Shape
2020

Reduced Density
Polymer Shape
2030

RAPID SOLID-STATE FOAMING

CROSS-REFERENCE TO RELATED APPLICATIONS

This application is a continuation-in-part of U.S. patent application Ser. No. 16/374,392, filed Apr. 3, 2019, entitled "Rapid Solid-State Foaming," which is a continuation of U.S. patent application Ser. No. 14/930,592, filed Nov. 2, 2015, now U.S. Pat. No. 10,322,561, entitled "Rapid Solid-State Foaming," which claims priority to and the benefit of U.S. Provisional Application No. 62/073,872, filed Oct. 31, 2014, and entitled "Reduced Density Thermoplastics," the disclosures of which are hereby incorporated by reference in their entirety.

This application is also a continuation-in-part of U.S. patent application Ser. No. 14/930,610, filed Nov. 2, 2015, entitled "Layered Structures," which claims priority to and the benefit of U.S. Provisional Application No. 62/073,872, filed Oct. 31, 2014, entitled "Reduced Density Thermoplastics," the disclosures of which are hereby incorporated by reference in their entirety.

FIELD

This disclosure relates generally to rapid solid-state foaming of thermoplastics.

BACKGROUND

Plastics are widely used in both durable and non-durable applications. The majority of non-durable plastics are used in initial packaging of goods and food service packaging, often in single use applications.

Using solid-state foaming for producing layered cellular structures in the context of a batch process may take hours to diffuse gas into the sheet, and the gas begins to diffuse from the sheet upon removal from a pressure vessel. The uneven amount of time in processing a roll after removal from a pressure vessel may result in non-uniform foam properties. The long processing times and resulting non-uniformity in rolls may require a large number of large, expensive pressure vessels in order to process plastic continuously.

For example, U.S. Pat. No. 8,591,799 teaches that 2 hours to 60 days are needed for saturating the solid with the inert gas. (col 5, lines 10-27). Thermoplastic polymers disclosed include polycarbonate, polypropylene, polyethylene, polyethylene terephthalate, polyvinyl chloride, poly(lactic acid), acrylonitrile butadiene styrene, and poly styrene. (col 4, lines 48-53) Pressures of 3-7.5 MPa are taught by that patent. (col 2, lines 23-27).

U.S. Pat. No. 8,377,548 utilizes 72 hours in Example 1 and 36 hours in Example 2 for the inert gas diffusion step. Disclosed thermoplastic materials included PET, PEEK, PEN, PBT, PLA, PHA, and thermoplastic urethane. (abstract). Examples 1 and 2 utilized PET polymer, —gas and a pressure of 5 MPa.

The disposal of plastic products results in huge amounts of waste. Recyclable plastic products must be cleaned before recycling, which consumes additional energy. Due to incomplete cleaning and degradation of the polymers during processing, they are often unable to be recycled into similar quality goods.

Foam plastic products produced through conventional means utilizing a chemical blowing agent improve of the aspects of performance of solid plastic products by adding insulation, cushioning to their benefits, and reducing the amount of material and cost to generate products, but often create new problems. Foamed plastic may become friable, and form small pellets nearly impossible to separate from a waste stream. The surface of foamed plastics is often cellular and unattractive to customers, and does not create packages durable enough for many food packaging applications such as yogurt packaging.

The chemical blowing agents, fluorocarbons and chlorofluorocarbons used in producing many foams have negative environmental effects, and the contamination of plastics from these blowing agents may render them non-recyclable. Traditional foaming technologies, such as extrusion foaming, generate a monolithic foaming structure. This cellular structure is efficient at reducing the density of a material, but it leads to a surface that is not suited for high-quality graphics, good impact resistance, or applying coatings to improve the performance of products.

Solid state foaming utilizing carbon dioxide, or other high-pressure gas, as a foaming agent has been explored as a resolution to some of the above problems. However, saturation of polymer sheet may be difficult to adapt to a conventional plastics factory.

Semi-continuous foaming is a method of interleaving a saturated roll of polymer with a gas-channeling means, which allows saturation of polymers prior to thermoforming. Semi-continuous production is a labor intensive process which consumes an interleaving layer and requires a large amount of plastic. Plastic loses gas during processing, and a large roll of plastic may take a long time to process, so the properties at the start of a foam roll may differ from those of the end of a roll. Layered structures in foam have been generated as described in U.S. Pat. No. 8,377,548. The images in this patent illustrate layered structures with skins. However, it can be viewed that the structures with a reduced density core contain a large number of small cells. These small cells are inefficient at reducing the density of a structure. The surface area of a cell is proportional to $4\pi r^2$, while the volume of a sphere is $$4\pi \frac{r^3}{3}.$$

A small cell contains much less volume for a given amount of material, resulting in relatively high density structures. However, these small cells lead to products with superior properties relative to those described supra.

The problems concerning the utilization of plastics in packaging, in both foam and solid form, extend to durable goods as well. A particular area of plastic usage for durable goods is composites, in which multiple phase separated materials are bonded together to create a single part with better properties. The center section of these parts is often foam. Most foams produced for these applications cannot be recycled after bonding, and are not biodegradable.

SUMMARY

The instant application discloses, among other things, rapid solid state foaming of thermoplastics. Rapid saturation methods for producing layered cellular structures in thermoplastic polymers may include exposing a thermoplastic polymer blank to a gas or fluid at a pressure of at least 500 pounds per square inch (PSI) for a time that does not exceed 10 minutes, followed by heating the polymer blank. Existing processes would not allow exposure to the inert gas for such a short time to be effective in producing a layered cellular structure. This short exposure time may make such a process commercially viable.

The instant application discloses, among other things, Layered Structures. According to one embodiment, a foaming process may produce layered structures in reduced density plastics with or without integral skins. In another embodiment, a foaming process may produce deep draw structures made from reduced density plastics with or without integral skins. In yet another embodiment, a foaming process may utilize additives, blends, or fillers, which may include polymer additives, polymer blends of thermoplastics including bioplastics, solid fillers, or additives which may allow high rates of gas diffusion into and out of thermoplastics, for example. In yet another embodiment, a coating is applied to a layered structure to improve its resistance to moisture and oxygen transmission. In yet another embodiment, a foaming process may involve saturating a polymer such as PLA with high levels of gas, and then heating, which may produce a reduced density plastic having high levels of crystallinity. There are existing reduced density polymer structures available to producing products, allowing cost savings and efficiency benefits which may be provided by reducing density. But the instant application provides configurations of reduced density objects that provide performance advantages over prior structures.

These techniques may be utilized with any thermoplastic. Utilizing these techniques with a biodegradable polymer such as PLA or a blend may result in low density, high strength, or heat-resistant compostable structures.

BRIEF DESCRIPTION OF THE DRAWINGS

Like reference numerals are used to designate like parts in the accompanying drawings.

DETAILED DESCRIPTION

Figure 1:
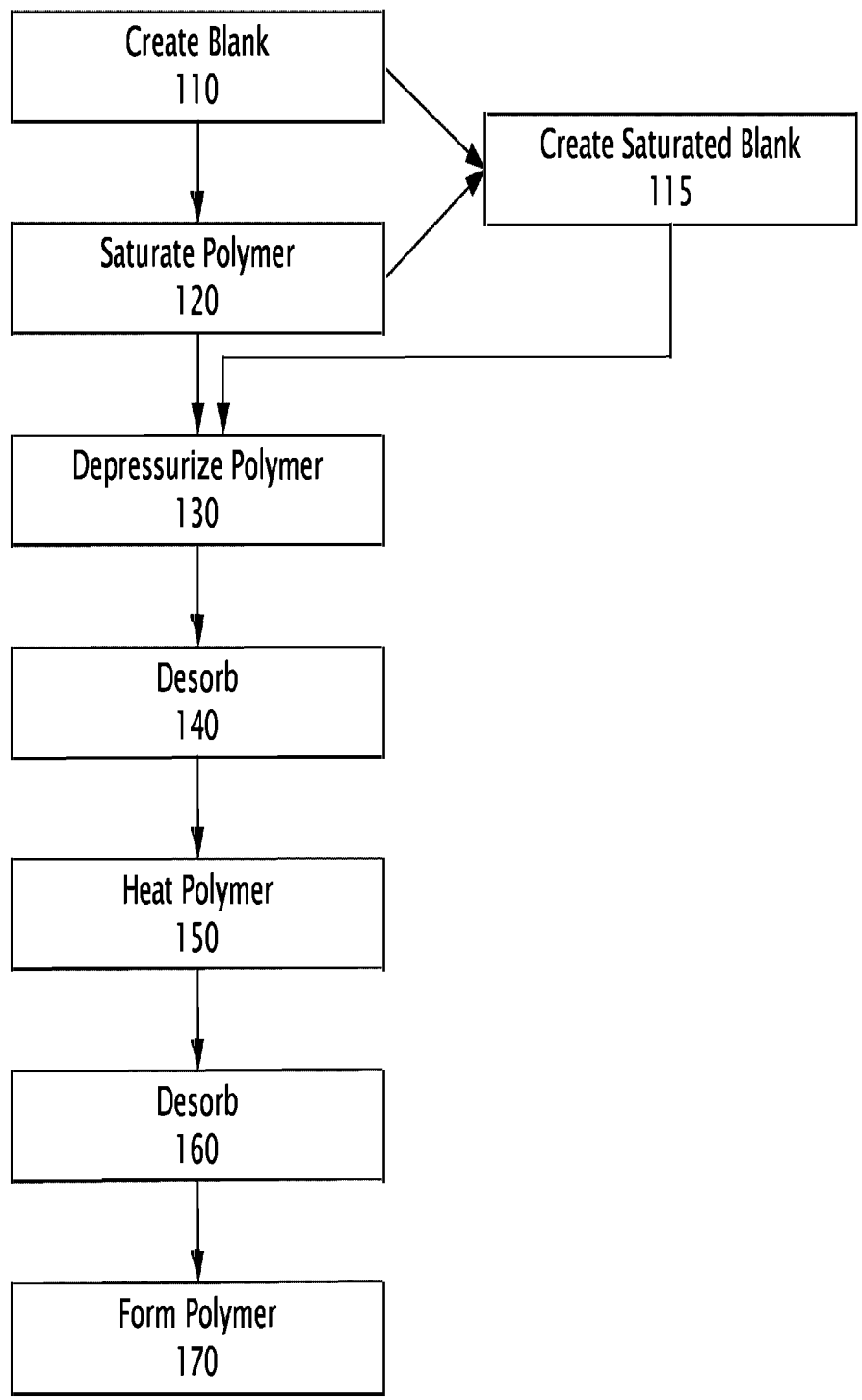
FIG. 1 is a flowchart for creating polymer foams, according to one embodiment.

A more particular description of certain embodiments of Rapid Solid-State Foaming may be had by references to the embodiments described below, and those shown in the drawings that form a part of this specification, in which like numerals represent like objects.

FIG. 1 is a flowchart illustrating a method of creating reduced density plastic parts. Create Blank 110 involves the generation of polymer blank to be saturated. This step may include injection molding, polymer extrusion, multi-layered polymer extrusion, or compression molding of a sheet. Saturate Polymer 120 may involve placing the polymer blank in an atmosphere under high pressure so that high-pressure gas or fluid permeates the polymer in a manner similar to water going into a sponge. This may be accomplished by placing the blank in a pressure vessel, or by feeding a sheet through a continuous saturation device. The pressure vessel may be filled with a gas including carbon dioxide, and may include a solvent such as water. It may be possible to combine steps 110 and 120 into a single step of creating to Create Saturated Blank 115. This may be accomplished by introducing a foaming agent into an extruder or injection molder, and allowing the blank to cool in a pressurized environment prior to depressurizing. The Saturated Blank may then be removed from a pressurized environment using a dynamic seal or pressure lock system. At Depressurize Polymer 130, the pressure from the pressure vessel may be released at a controlled rate. Desorb 140 may be an optional step in the process, in which some of the gas is allowed to desorb from the polymer in a controlled environment, for example, a lower pressure or ambient conditions. At Heat Polymer 150, the saturated blank may be heated, initiating foaming of the polymer. If a flat object is desired, the process may be ended at this point. Desorb 160 is an optional step in which some gas may be further allowed to escape prior to forming the object. At Form Polymer 170, the polymer may be heated and formed into a useful shape, such as a dinner plate or drink cup. This step may be performed on conventional thermoforming equipment, in which the foamed sheet is heated, and then drawn into shape using air pressure, mechanical force, or a combination thereof. Forming may also include folding and bonding processes similar to those used in creating products from paper.

Saturation parameters may include gas foaming agent used, pressure, temperature, humidity, solvent used, and time. Varying these parameters may provide reduced density thermoplastics with differing properties, including strength, crystallinity, layer structure, insulation value, and flexibility.

One embodiment utilizes Polylactic acid (PLA), a biodegradable polymer, resulting in reduced density bioplastic structures. These methods may be applied to most thermoplastics and thermoplastic blends by varying processing conditions. The end products will be compostable provided all constituent materials are compostable.

The term biodegradable polymer is used in this application to represent a polymer that will degrade under certain conditions. Example conditions include those prescribed by ASTM D6400, after being planted in soil for one year, or in the presence of certain solvents and/or enzymes. The biodegradable polymer may be composed of a blend of bio-based polymers, petroleum-based polymers, and any additives that are useful in the processing of these polymers or in the use of final end products.

Figure 2:
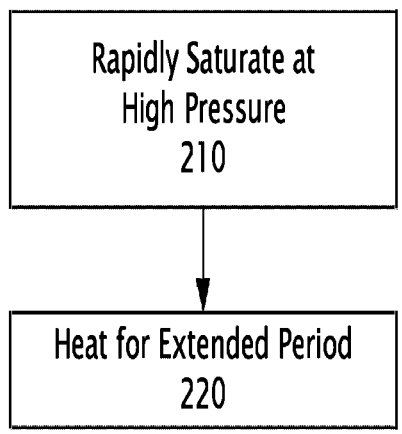
FIG. 2 is a flowchart for creating polymer foams through a rapid process, according to one embodiment.

FIG. 2 is a flowchart for creating polymer foams using a rapid solid-state foaming process, according to one embodiment. Traditionally, solid-state foaming has been a process that may involve many hours or days of saturation time. At Rapidly Saturate at High Pressure 210, a polymer sample may be saturated at high pressures for a short amount of time. An example of this application is saturating polylactic acid sheet of a thickness of 0.024" inches this for 3 minutes at 900 PSI. At Heat for Extended Period 220, the sample is heated for an extended amount of time. For example, 15 to 60 seconds of heating at an elevated temperature may be found to be effective. Supercritical saturation conditions have been found to be effective in polymers with slower diffusion rates. In general, saturation times under 15 minutes above pressures of 500 PSI may be of use in generating polymers.

These conditions may be useful in applications with semicrystalline polymers, including PLA and PET. A layer with increased crystallinity levels may form near the surface of the polymer blank during saturation, and after removal due to the high internal pressure of gas near the surface. Highly crystalline sections of the polymer have lower diffusivity than more amorphous sections. The crystalline outer layers may effectively encourage the diffusion of gas towards the center of the polymer during heating.

In Heat for Extended Period 220, the temperature of the Saturated Polymer Blank may be increased to a temperature slightly below that used for thermoforming a polymer. This softened plastic state may enable the diffusion of foaming agent throughout the polymer blank.

Figure 3:
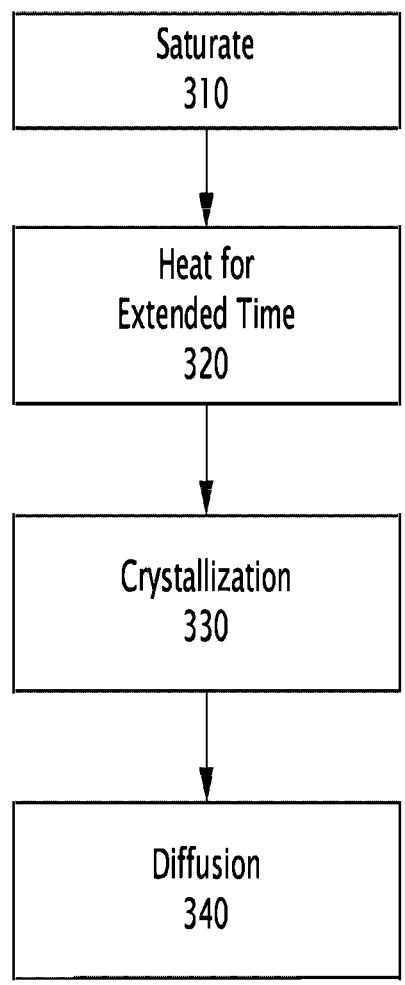
FIG. 3 is a flowchart for creating semi-crystalline, low-density thermoplastic structures with high service temperatures, according to one embodiment.

FIG. 3 is a flowchart for creating semi-crystalline, low-density thermoplastic structures with high service temperatures, according to one embodiment. This may be useful in the field of biodegradable polymers, which have traditionally exhibited low service temperatures.

At Saturate 310, a polymer blank may be saturated. The crystallinity of the polymer sample may be raised during this step by the presence of $CO_2$ in the polymer, either throughout or at the surface of the sample. At Heat for Extended Time 320, holding the sample at an elevated temperature for a long period may bring about Crystallization 330 of the sample, raising its service temperature.

This technique, in combination with that described in FIG. 2, may be used in highly crystallizable blends of PLA such as Natureworks™ 2500HP and 4032D, using PLA/biodegradable polymer blends with elevated service temperatures, or in the use of PLA with fillers. Natureworks™ 2500HP saturated for 3 minutes at 900 PSI, then heated at a temperature of 99 Celsius in a water bath held over 95° C. for at least 15 seconds has been shown to exhibit adequate service temperatures to withstand boiling water on one side when shaped into shallow draw bowls. Different combinations of heating rate and time may be used to generate crystallinity in the sample. Longer heating times may be required for polymers that crystallize less rapidly. Crystallizing additives may reduce the heating time necessary to generate crystallinity in the polymer.

Figure 4:
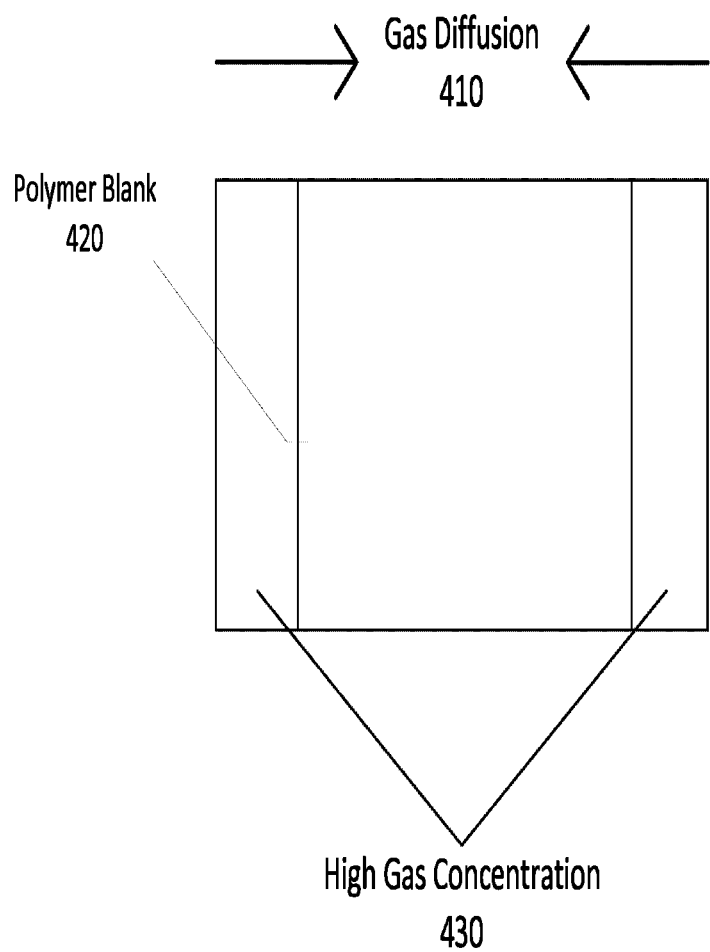
FIG. 4 illustrates gas diffusion that occurs during a rapid saturation process, according to one embodiment.

The extended heating time also encourages the Diffusion 340 over time, as illustrated in FIG. 4, wherein a high gas concentration at the surface of the polymer blank diffuses towards the center of the sample. The elevated temperature may increase the fugacity of the gas held in the sample, and may also decrease the resistance of diffusion within the polymer. Crystallization 330 and Diffusion 340 may occur simultaneously in some embodiments.

The short duration of time in the pressure vessel is a benefit in processing semi-crystalline polymers because it will increase the crystallinity of the polymer to a less degree than a longer saturation time would. A high degree of crystallinity would generate small cells in the polymer that are not as effective at reducing densities as large cells.

FIG. 4 illustrates Gas Diffusion 410 that occurs during a rapid saturation process. Polymer Blank 420 may be not completely saturated in a pressure vessel, but High Gas Concentration 430 near a surface of a polymer blank may be sufficient to enable gas diffusion through the remainder of the polymer. The crystallization of semi-crystalline polymers under high $CO_2$ pressures may be reduced compared to traditional processes with lower pressures.

When saturating highly crystallizable of polylactic acid such as Natureworks™ 2500HP, or blends of Natureworks™ 4032D or Natureworks™ 2003D with crystallizing additives, high crystallinity levels may inhibit expansion of the polymer. Ethylene bistearamide in concentrations of one to three percent may be an effective crystallizing agent; talc in concentrations of one-half to forty percent has also been found to increase crystallization in PLA. This method may generate a crystalline layer at the surface, but may avoid crystallinity through the whole sample that may inhibit polymer expansion. Lower polymer densities may generate products using less material, and so similar products may be produced at lower cost. If desired, crystallinity may be generated in the parts during heating to induce foaming, and also by heat setting in a mold after thermoforming.

Figure 5:
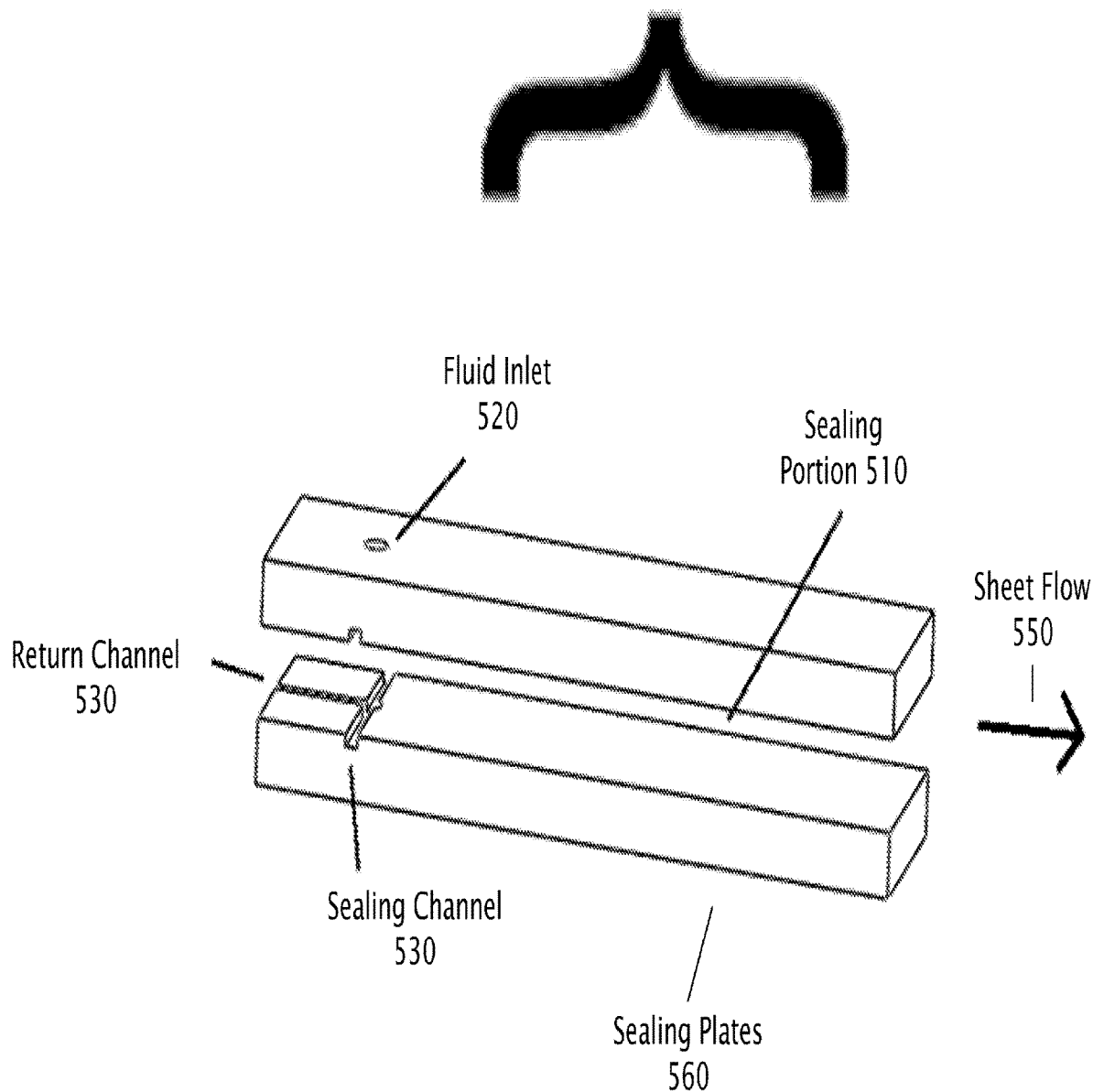
FIG. 5 is a schematic for a dynamic seal, according to one embodiment.

FIG. 5 is a schematic for a Dynamic Seal 570, according to one embodiment. A polymer sheet (not shown) would enter on the left side of the illustration and exit on the right, where a high-pressure area may exist, creating Sheet Flow 550. The Sealing Portion 510 may be composed of two Sealing Plates 560 which may be composed of metal or other rigid material. Introducing fluid through two Fluid Inlets 520 (located on top and bottom Sealing Plate) will pass through Sealing Channel 530, and also through Return Channel 540.

Dynamic Seal 570 functions by creating a high-pressure area near Fluid Inlet 520, which directs fluid towards an area of high pressure such as a pressure vessel and also in the direction of Sheet Flow 550. A pressure gradient is generated by flow entering the dynamic fluid seal, by mixing of flows around Fluid Inlet 520 and Sealing Channels 530, and by the forcing of working fluid through a set of relatively narrow channels created between the polymer sheet, Sealing Plates 560, and edges of the device and sheet. A Dynamic Seal 570 twelve inches in length has been found to be able to generate a pressure differential of 900 PSI between the exit of Sheet Flow and the Pressure Vessel. The pressure Vessel may be held at 1000 PSI while the exit of the device has a narrow stream of working fluid exiting at pressures of 100 PSI, similar to a pressure one might find in a garden hose. It has been found that maintaining a gap of 0.002 inches to 0.005 inches between the Sealing Plates 560 and polymer sheet, and maintaining a gap between the edges of the polymer sheet and sealing device edges (not shown) of less than 0.020 inches with water as a working fluid is sufficient to maintain this seal. It is noted that using a higher viscosity Working Fluid would decrease flow rates. Using a food contact approved substance such as water, Glycerine, or food-safe hydraulic fluid will enable the production of agricultural and food-contact approved items.

The geometry and location of fluid channels may be changed. The device may function adequately without fluid inlets, drawing fluid for a seal from a central reservoir of a fluid-based continuous saturation device. An important element of this design is an elongated structure with approximately the same shape as the object to be saturated. Fluid traveling parallel to sheet motion in the same or opposite direction through a relatively small gap will create a pressure differential that may function as a dynamic seal.

Cincinnati Test Systems published Application Bulletin #120 in September 2009, which disclosed a formula for estimating liquid flow through a hole, which takes into account diameter and length of the hole. The flow rate through a round hole is proportional to its diameter raised to the fourth power and inversely proportional to the length of the hole. The leakage from this seal may be understood as minimizing the effective diameter while providing a long length of the hole.

Although the design shown illustrates a seal that might be used to remove sheet from a pressure vessel, it can be recognized that the design could have reversed Sheet Flow 550 and allow sheet to enter a pressure vessel. A sheet entering a pressure vessel through such a seal, removing the fluid by a wiper seal, and entering a high-pressure gas chamber could be continuously saturated.

The cross section perpendicular to sheet flow of the seal may have any shape in order to generate different polymer shapes. The cross section of the seal parallel to sheet flow may be varied.

Limiting flow in a dynamic seal may be effected by creating a series of reduced areas for flow, which then expand into a large area. Turbulence would be generated by each restriction, creating a pressure differential.

This seal may be utilized by directly attaching it to a sheet extruder. A pressurized area may be created at the exit of the extruder through the introduction of high-pressure gas, with extruded sheet passing through this dynamic seal. The extruded sheet may incorporate a foaming agent present in the sheet, or a foaming agent may be introduced in a pressurized area between the extruder exit and the Dynamic Seal. This would allow a gas-saturated polymer sheet to cool and not foam until reheated, enabling Create Saturated Blank 115. There may be resistance to sheet motion created by the pressure differential and motion of fluid in a fluid-based seal. Driven wheels may be incorporated directly into the seal to drive the sheet through the seal. For example, there may be a set of four wheels located at the sheet exit and entrance of each seal. The four wheel surfaces may be elastomeric, and may contact the seal near the edges of the sheet in opposed pairs. The wheels may, for example, be driven through motor-driven shafts with axes perpendicular to sheet travel.

Figure 6:
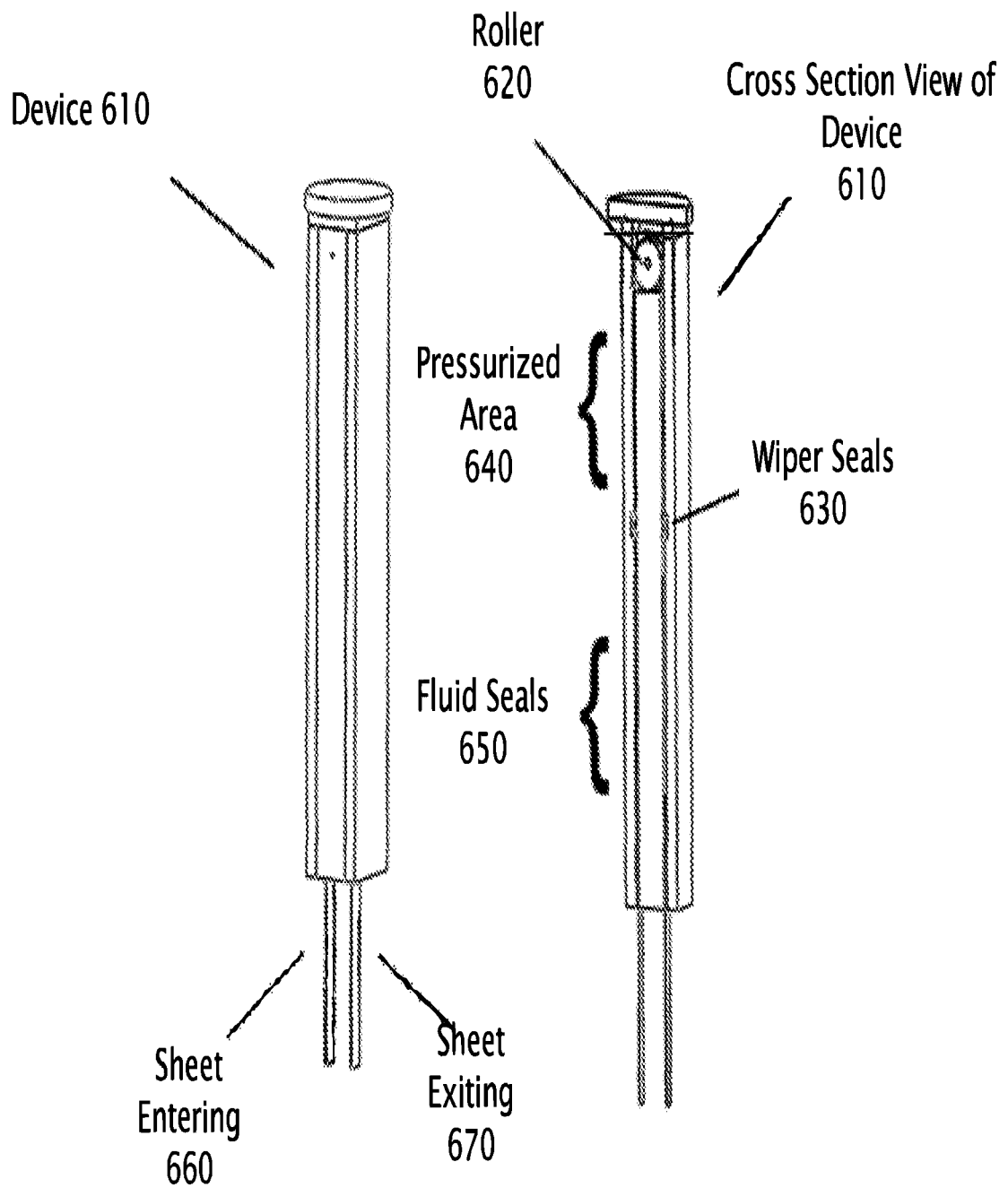
FIG. 6 illustrates an embodiment of a continuous saturation device with a single festoon.

FIG. 6 illustrates an embodiment of a continuous saturation Device 610 with a single festoon. Sheet Entering 660 occurs on the left side of the device, passing through a Fluid Seal 650, through Wiper Seals 630, through a pressurized area 640, over a roller 620, and Sheet Exiting 670 through a second set of Fluid Seals. In Pressurized Area 640, a small gap of a few thousands of an inch larger than the sheet size may be used to expose polymer material to a saturating gas or solvent. Minimizing the volume of a Pressurized Area 640 reduces the cost of the system, and reduces risks resulting from rapid decompression or device failure.

This design may be useful in continuous saturation of polymers because it may be designed with a minimum of Pressurized Area volume. All fluid leakage may occur at the bottom of the device, which may allow easy collection. The device may be designed with a Pressurized Area 640 volume of less than 1.5 cubic feet if the working pressures are 600 PSI or less, or a linear interpolation of decreasing volume as pressure increases.

An inexpensive method for constructing this device may be to use 2 metal plates for the exterior surfaces, and a thicker metal plate for the interior surface. The exterior metal plates may be spaced from the interior surface plate using shim to provide room for sheet to pass. The interior metal plate may be machined to allow installation of the roller. A cap may be bolted onto the top of this assembly in order to aid in maintenance and sheet feeding to begin operation of the machine. It may be beneficial to reinforce the material plates by placing a portion of the mechanism inside of another pressure vessel, or attaching an exterior frame meant to reduce the bending stress in the plates when under pressure.

It would be possible to create a device with a similar design, but multiple festoons, in order to generate a longer path for saturation to occur.

Figure 7:
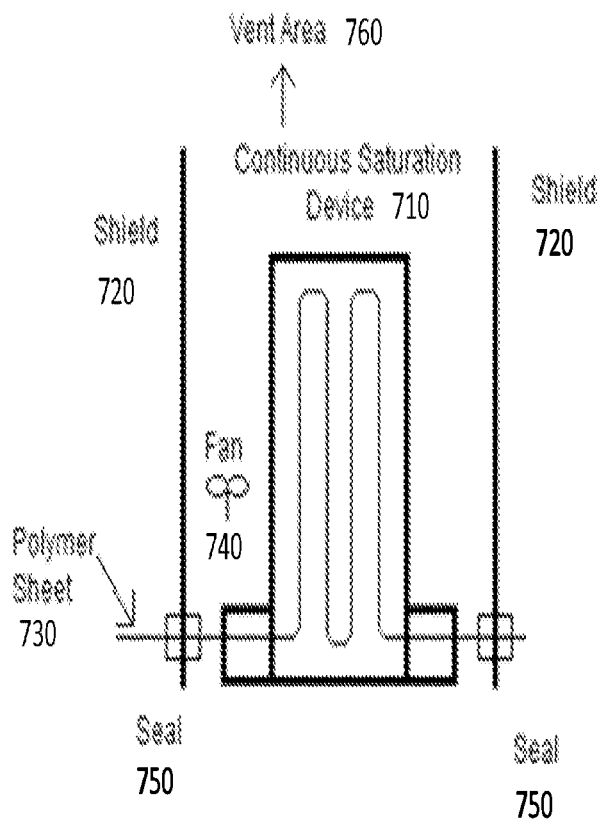
FIG. 7 illustrates a system that may enable the use of continuous saturation devices.

FIG. 7 illustrates a system that may enable the use of continuous saturation devices. Continuous Saturation Device 710 may be placed within Shield 720, through which Polymer Sheet 730 may travel. Shield 720 may be constructed in a significantly lower cost manner than the pressure vessel because it may not need to withstand high pressures. A circulating device, such as a Fan 740, for example, may be used to vent any gas which escapes dynamic Seal 750 of Continuous Saturation Device 710. The gas may be released into Vent Area 760.

Shield 720 may be constructed in such a manner that in the event of a dynamic Seal 750 fail, the gas venting from the pressure vessel is vented to a safe area. The Shield 720 may be constructed to mechanically withstand either seal failure or explosive decompression.

Figure 8:
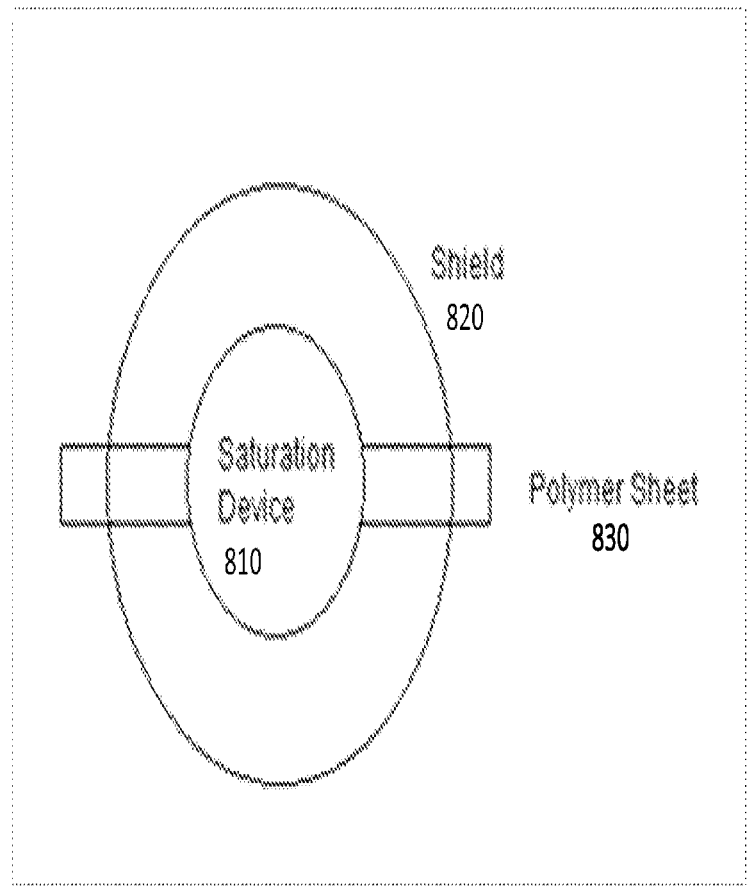
FIG. 8 is an overhead view of a system for continuous saturation of polymers in a safe manner, according to one embodiment.

FIG. 8 is an overhead view of a system for continuous saturation of polymers in a safe manner, according to one embodiment. Saturation Device 810 may be within Shield 820, and Polymer Sheet 830 may pass through both the Shield 820 and Saturation Device 810. Note that the shield may contain a much larger volume than the saturation device; which may reduce the strength required to restrain explosive decompression. Maximizing the vent area of the shield, possibly by extending the shield to the roof of a structure, may be desirable.

It may also be desirable to re-capture and re-pressurize foaming agent from this enclosure. It may be desirable to generate a similar enclosure, or size the enclosure large enough to include a polymer depressurization or foaming area. Recapturing foaming agents from these enclosures would reduce the amount of foaming agent required to generate reduced density polymer structures.

Figure 9:
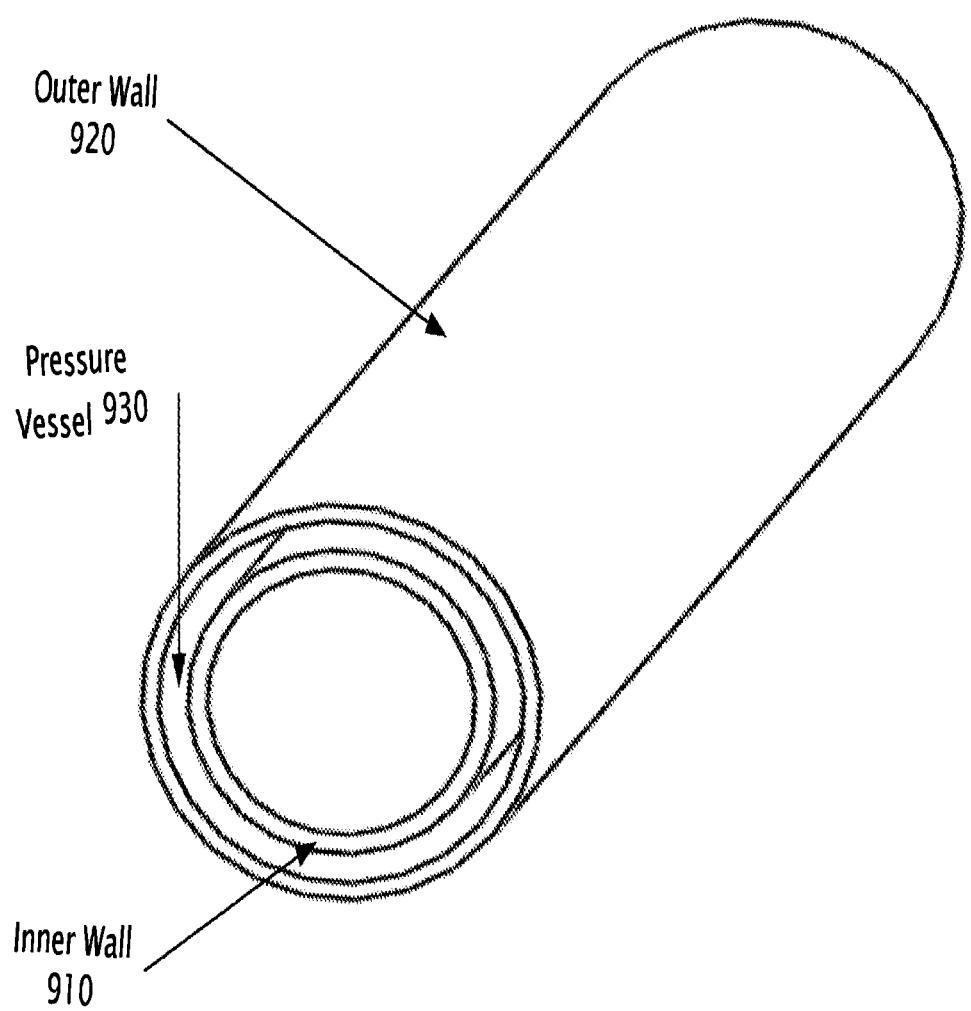
FIG. 9 is a perspective view of a system for continuous saturation of polymers in a safe manner, according to another embodiment.

FIG. 9 is a perspective view of a system for continuous saturation of polymers in a safe manner, according to another embodiment. Inner Wall 910 and Outer Wall 920 may comprise two differently-sized pipes, providing a gap between them. The gap between the pipes can be used to form Pressure Vessel 930. The ends are not shown, but may include elements of dynamics seals to allow sheet to continuously enter and exit the Pressure Vessel 930. A sheet could enter into Pressure Vessel 930 by being wrapped into a circular form, and entering and exiting through a dynamic seal. The sheet could also wrap around Inner Wall 910 at an angle of approximately 45 degrees to its axis, traversing through Pressure Vessel 930 as it wraps around Inner Wall 910.

Figure 10:
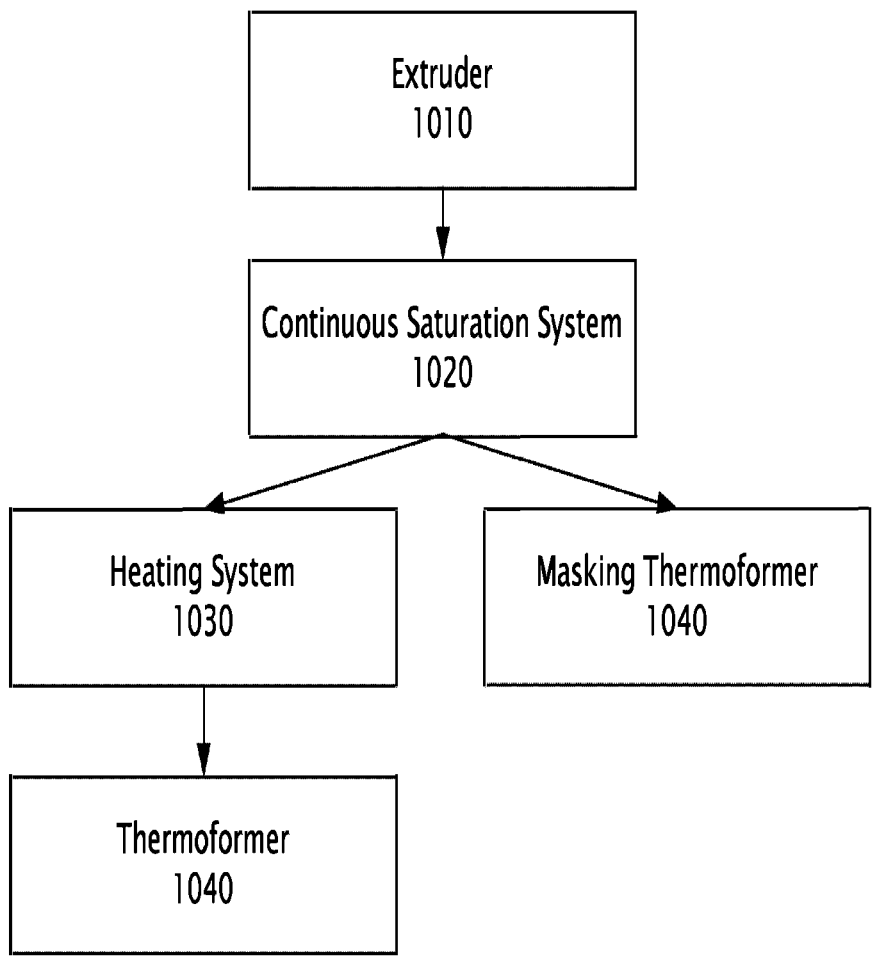
FIG. 10 is a block diagram of an arrangement of components for production of low-density thermoplastic products.

FIG. 10 is a block diagram of an arrangement of components for production of low-density thermoplastic products. Placing Continuous Saturation System 1020 immediately after Extruder 1010 may allow the continuous production of saturated sheet. One embodiment is to place Heating System 1030 after Continuous Saturation System 1020, and low-density thermoplastic products may result. A conventional thermoformer may be placed immediately after Heating System 1030, allowing continuous production of thermoformed products.

In another embodiment a thermoformer with masked heating capabilities, Masking Thermoformer 1040, may be placed immediately after a continuous saturation system.

Figure 11:
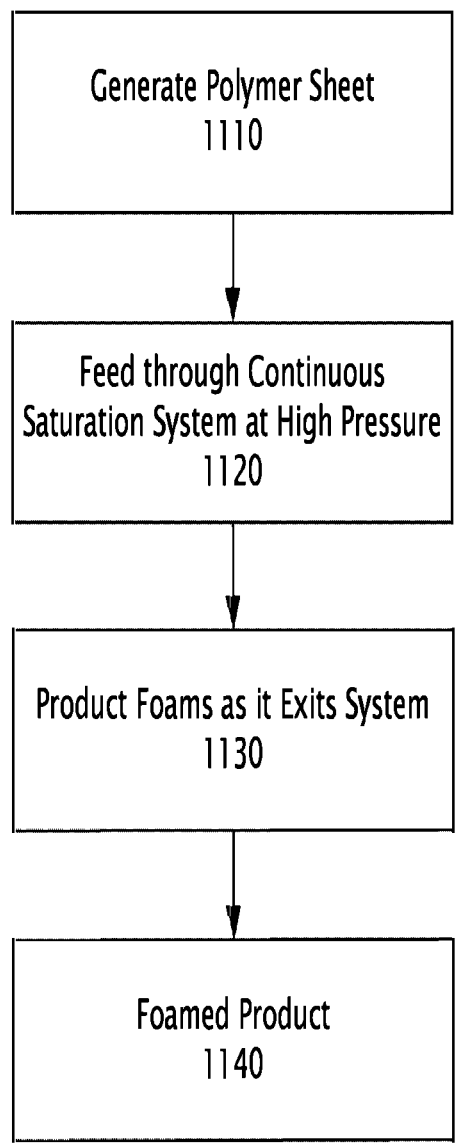
FIG. 11 is a flow diagram for steps for production of low-density thermoplastic formed products, according to another embodiment.

FIG. 11 is a flow diagram for steps for production of low-density thermoplastic formed products, according to another embodiment. Generate Polymer Sheet 1110 may be any thermoplastic, most particularly bioplastic composites as described herein. Feed Through Continuous Saturation System at High Pressure 1120 may be a step in which the polymer sheet is saturated to a point at which it reaches a sufficient gas concentration at a sufficient temperature to initiate Product Foams as it Exits System 1130. Additional heat may be applied after step 1130, which may further reduce the density of the polymer. This may generate Foamed Product 1140.

One example of this would be to expose a solid sheet of 0.02 inch thick Polycaprolactone (PCL) polymer to carbon dioxide 1100 PSI at a temperature of 33° C. in a continuous saturation system, for a sufficient amount of time to allow the PCL to at least partially saturate to a level of gas concentration that will foam once it is removed from a pressurized environment without additional heating. This may generate low-density PCL structures.

If a fluid based seal is used in this embodiment, widening the opening as the sheet traverses through the decreasing pressure differential that may exist in a fluid seal may allow for foaming in the exit portion of the fluid seal.

A more particular description of certain embodiments of Layered Structures may be had by references to the embodiments described below, and those shown in the drawings that form a part of this specification, in which like numerals represent like objects.

Figure 12:
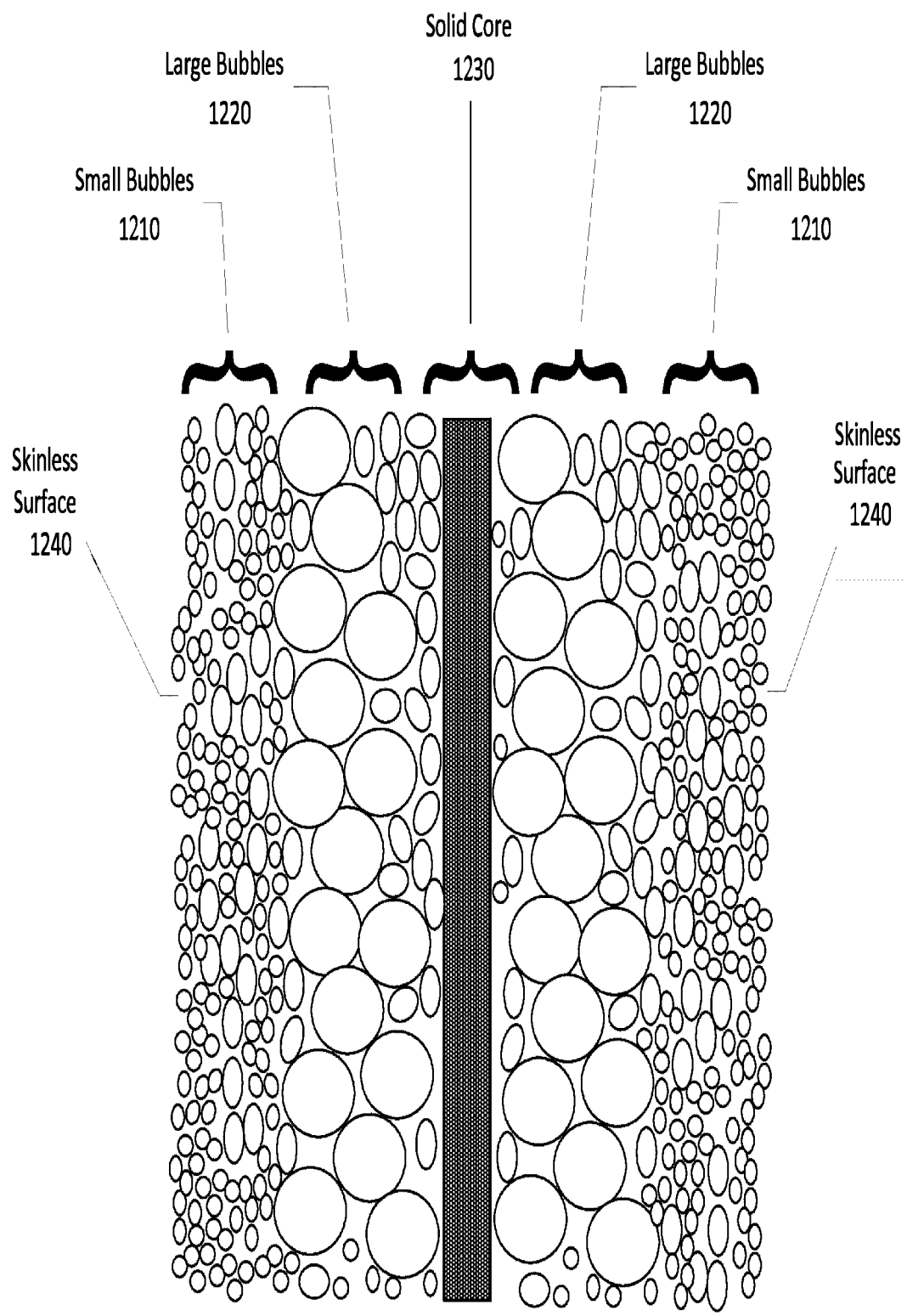
FIG. 12 illustrates an example of Layered Structure in reduced density polymers having no integral skins, according to one embodiment.

FIG. 12 illustrates an example of Layered Structure in reduced density polymers having no integral skins, according to one embodiment.

Two layers of Small Bubbles 1210 may surround a core of Large Bubbles 1220, which in turn may surround a Solid Core 1230. Small Bubbles 1210 may be approximately up to 50 µm in diameter, while Large Bubbles 1220 may be larger than 51 µm in diameter. It may be recognized that asymmetric structures could be generated by heating one side of the polymer more than the other, or by modifying the polymer through the use of additives.

The skin's cellular structure may be generated by heating a polymer in a bath for an extended period; gas which may have left the surface prior to heating may be replaced by gas diffusing outward from the polymer core.

Structures may be generated with an open cellular structure by rapidly venting a pressure vessel while depressurizing a polymer, and then heating the polymer further.

Large cells at the surface of polymer samples may yield a product that is porous and not capable of holding water since the large cells may rupture when subjected to rapid depressurization. Thus, it may be desirable that a layer with sufficient crystallinity is generated near the surface of the polymer to enable rapid depressurization without ruptured cells.

In polylactic acid saturated at 650 PSI for ten minutes, rapid depressurization is depressurization that occurs in less than 10 seconds; slow depressurization is depressurization over periods longer than 10 seconds. This time may vary depending on polymer properties, and gas concentrations at the surface.

The techniques described in herein may be used to generate a plurality of layered structures in polymers without integral skins, as shown by Skinless Surface 1240. The object created may avoid the necessity of laminating components together in other manufacturing methods. A crystallinity gradient may be generated throughout the cross section of the polymer, yielding different properties through the cross section. All layers may be integral with one another, while properties of each of the layers may be unique.

Layered Structures may include a single layer or multiple layers of cells with diameters under 100 micrometers without skins, and also may include a solid core without skins. Layered Structures may include structures composed entirely of cells over 100 micrometers in diameter. Layered Structures may include structures that may incorporate cells under 100 micrometers, cells over 100 micrometers, may have no skins, and may have a solid core.

Layered Structures may include polymers with porous skins and ruptured internal cellular structures.

Figure 13:
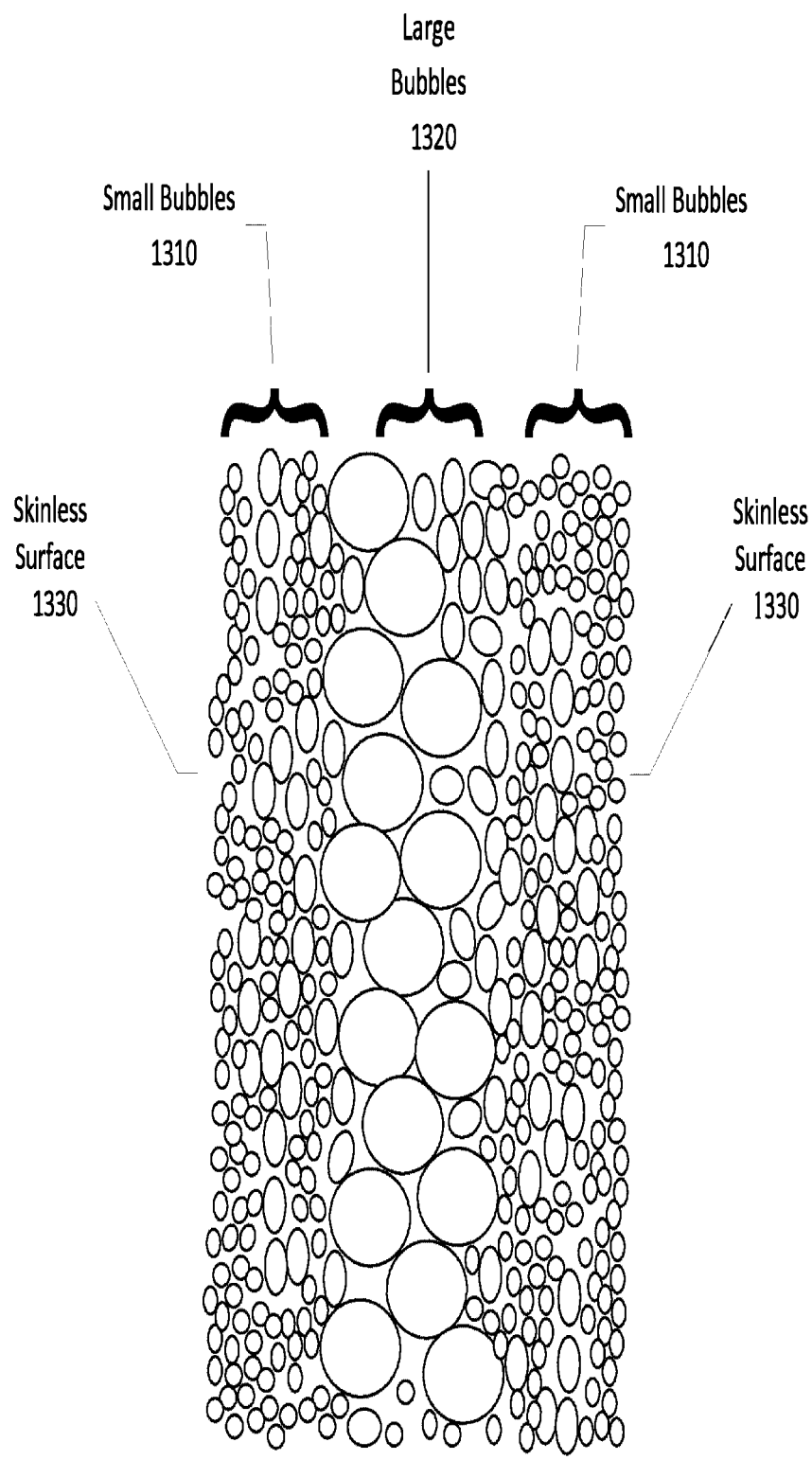
FIG. 13 illustrates an example of Layered Structure in low-density thermoplastics having no integral skins, according to another embodiment.

FIG. 13 illustrates an example of Layered Structure in low-density thermoplastics having no integral skins, according to another embodiment. Two layers of Small Bubbles 1310 may surround a core of Large Bubbles 1320. Small Bubbles 1310 may be approximately up to 50 µm in diameter, while Large Bubbles 1320 may be larger than 51 µm in diameter. No skin may be present, as illustrated by Skinless Surface 1330. A cellular structure with a single cell size or a range of cell sizes, with or without skins, may be generated.

Figure 14:
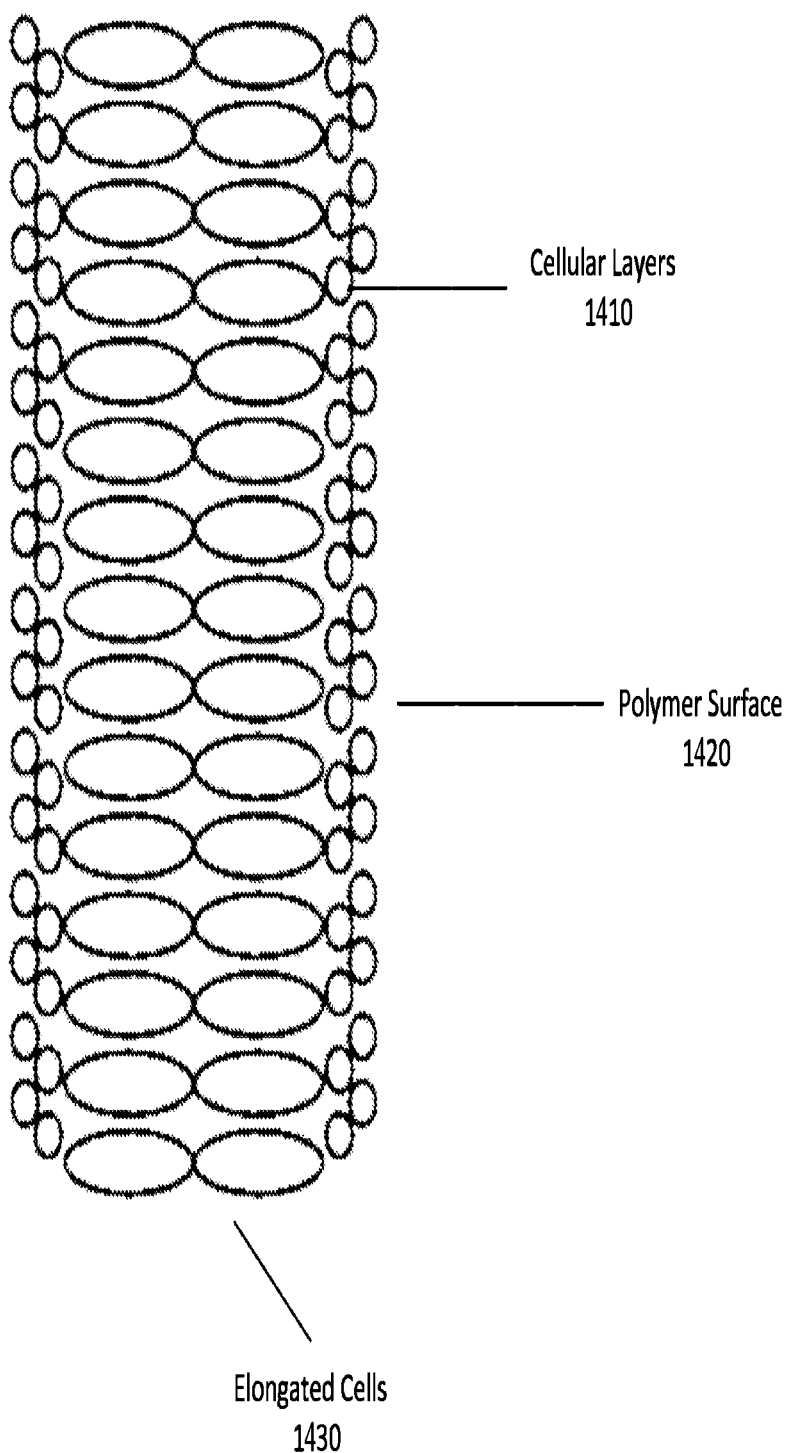
FIG. 14 illustrates Layered Structure of low-density thermoplastics containing elongated cells near the polymer core, according to one embodiment.

FIG. 14 illustrates Layered Structure of low-density thermoplastics containing elongated cells near the polymer core, according to one embodiment. In this embodiment, two Cellular Layers 1410 may surround a core of Elongated Cells 1430. Elongated Cells 1430 may be composed of a single or many layers of cells which are oriented in a direction normal to the exterior surface of the cellular structure. Cellular Layers 1410 may include single or multiple layers of cells of single or multiple sizes. Polymer Surface 1420 may be composed of two exterior skin layers, an asymmetric structure wherein one side of the polymer includes a skin and the other does not, or a skin-free surface of a cellular layer.

This structure may result from having a high gas concentration at the surface of the polymer, and lower gas concentration near the center of the polymer during foaming of a saturated polymer. The lower gas concentration at the center of the polymer generates large cells which are constrained by an exterior surface which is less prone to expansion.

The elongated cell structure may include a solid core. One embodiment provides a layered structure in which at least 30 percent of the wall structure of a reduced density object is composed of elongated cells. This may provide good structural efficiency and a reduced density. This structure may be used in thermoformed structures, for example, those described in FIGS. 16 through 23. A cellular structure with a single cell size or a range of cells, with or without skins, may be generated.

Figure 15:
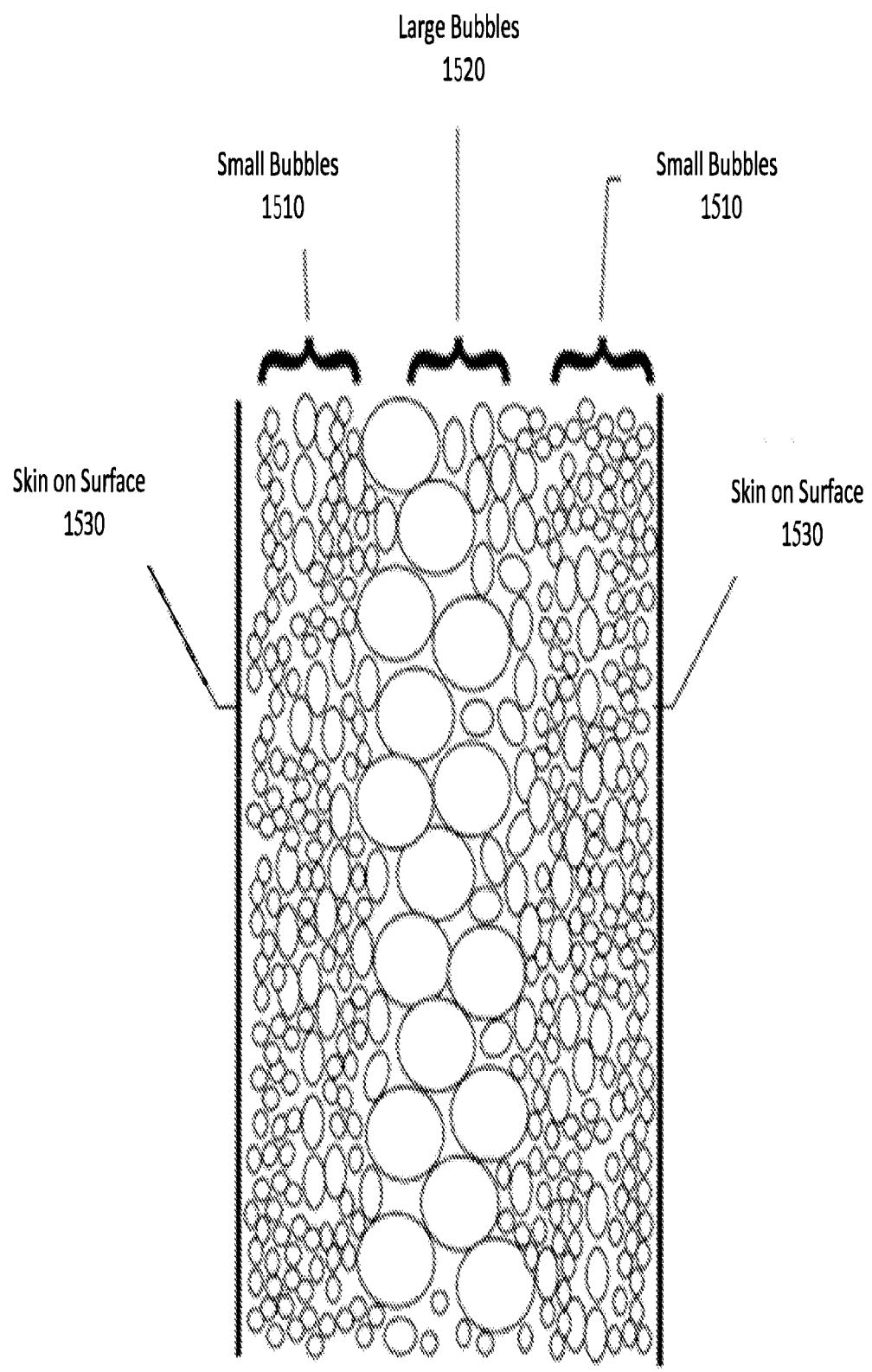
FIG. 15 illustrates an embodiment of Layered Structure in low-density thermoplastics with skins, according to one embodiment.

FIG. 15 illustrates one embodiment of Layered Structure in low-density thermoplastics. In this embodiment, two Skin on Surface Layers 1530 surround two Cellular Layers 1510, which in turn surround of a core of Elongated Cells 1520. It may be recognized that the cellular layers may be modified by the use of additives, gas concentration levels, and heating conditions. It may also be possible to create a polymer structure with a skin on only a single side by only heating on a single side of a polymer. A cellular structure with a single cell size, or a range of cells, with or without skins may be generated.

While the examples described above have used structures with rectangular shapes, other shapes are also contemplated. For example, a sphere may be considered to have surfaces on opposite sides by considering slicing the sphere through a middle, or by taking a cylindrical sample through a middle, giving surfaces on each end of the cylinder.

Figure 16:
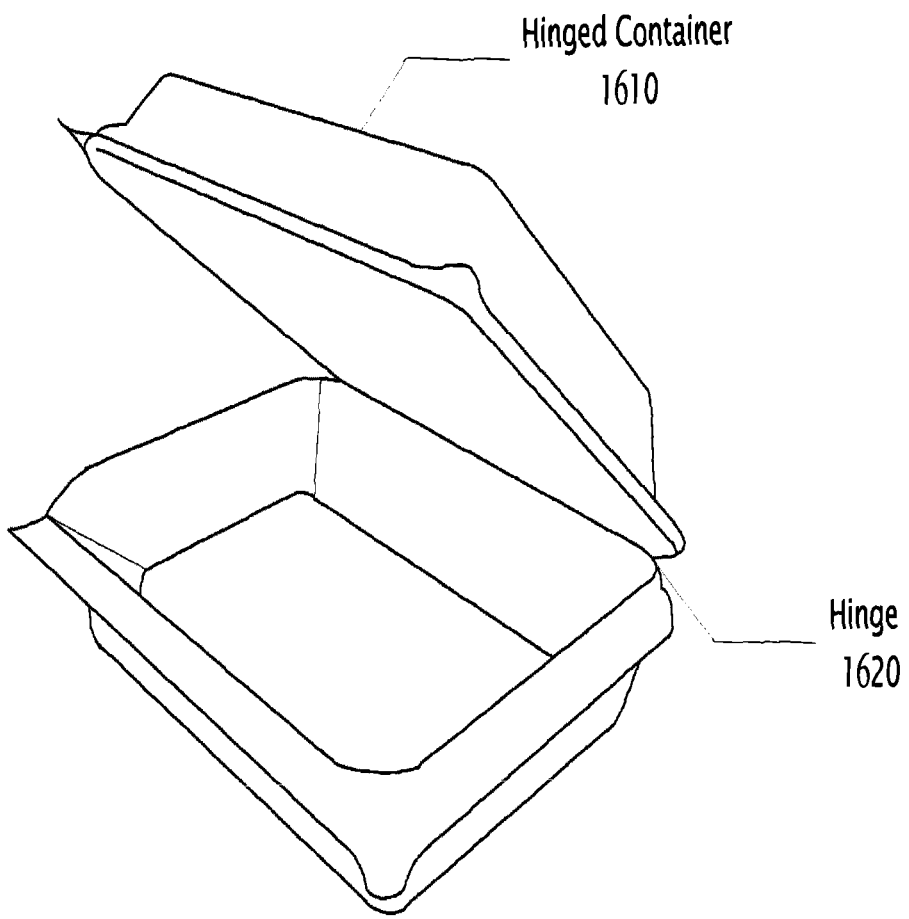
FIG. 16 illustrates a hinged container made from a polymer such as low-density PLA with sufficient crystallinity levels to withstand high temperatures, according to one embodiment.

FIG. 16 illustrates Hinged Container 1610 made from a polymer, for example, reduced density PLA, with sufficient crystallinity levels to withstand plastic blend capable of withstanding temperatures of at least 75° C., according to one embodiment. In this example, Hinged Container 1610 may be created by using crystallizable blends of PLA, saturating it with high levels of $CO_2$ or another gas, then heating. The heated sheet may be formed into a shape at any time, for example, immediately after saturation or after the sheet has cooled. Hinged Container 1610 may include Hinge 1620 and may be sufficiently ductile using neat PLA or another biopolymer.

Hinged Container 1610 may have a wall thickness of as little as 0.010" inches if the material is of densities greater than 60% relative to that of solid plastic, or may have a wall thickness as great as 0.150" inches thick if the density of the material is lower than 20% relative to that of solid plastic.

Figure 17:
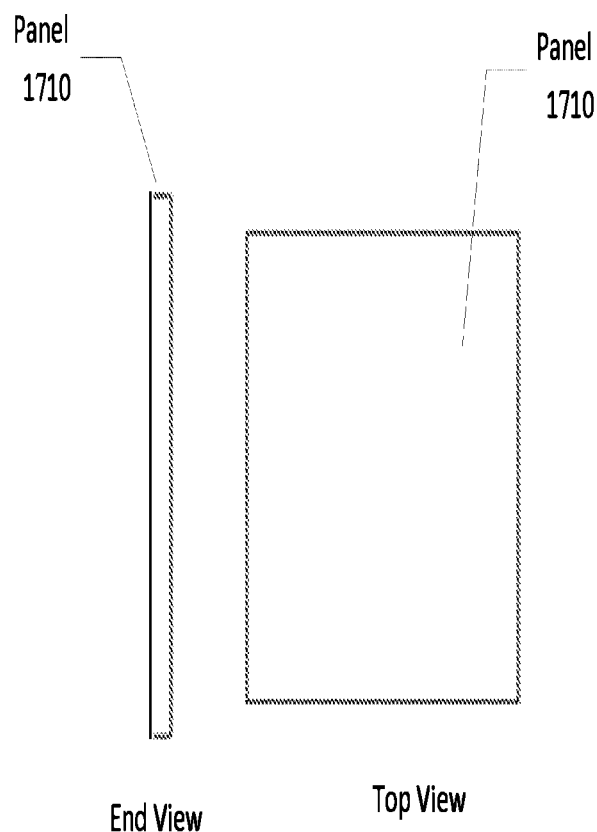
FIG. 17 illustrates a side view and a top view of Panel 3010 generated from low-density polymer composites, according to one embodiment.

FIG. 17 illustrates a side view and a top view of Panel 1710 generated from low-density polymer composites, according to one embodiment.

Figure 18:
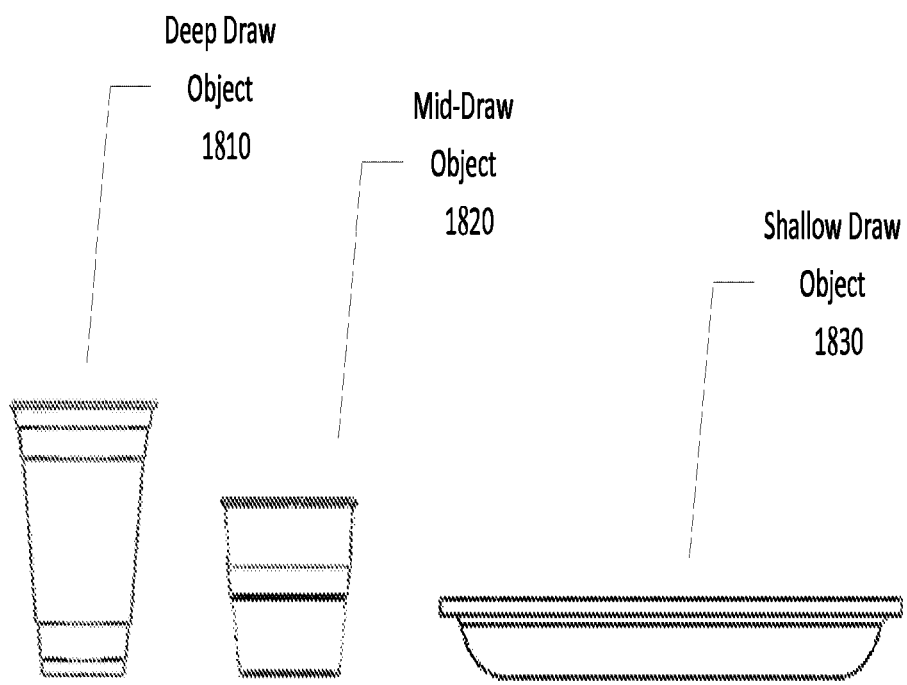
FIG. 18 is an illustration of objects that may be generated from low-density polymer composites, according to one embodiment.

FIG. 18 is an illustration of objects that may be generated from low-density polymer composites, according to one embodiment. Shown are Deep Draw Object 1810, such as a drink cup, Mid-Draw Object 1820, such as a soup bowl, and Shallow Draw Object 1830, such as a plate. In one embodiment, low-density polymer composites may have a cellular structure, which may be layered, and which may withstand exposure to solids and liquids of at least 180° F., or 212° F. to hold boiling water, on one side of the structure. This material may be a highly crystallizable blend of PLA, with crystallizing additives, and may contain fillers. Although the shape of the objects may be described by their applications in foodservice, one having skill in the art will recognize that the objects may have many other applications. Deep draw objects such as planters may be created through these methods; incorporating polymer blends and/or fillers so the planters may degrade when planted in soil.

Shallow Draw Object may also include lids for Deep Draw Object 1810, Mid-Draw Object 1820, or similar objects produced from other materials. A lid for a hot beverage cup may be produced from a low-density thermoplastic structure that is sufficiently crystalline to withstand intermittent exposure to hot beverages. It may be possible to produce this part using a cold mold since crystallinity may be induced in the sheet prior to forming.

Compostable filler may be incorporated in any of these objects, which may lend a "papery" feel to the product and provide identification of the products to consumers. Talc of 1-30% concentration by weight has been found to be effective in one embodiment. This may provide a surface roughness greater than 0.5 microns, or a gloss of 30% or less at an angle of 60 degrees when measured with a gloss meter.

In another embodiment, a tray of two or more compartments, with a depth of draw of fewer than 3 inches in depth may be provided. Similar items may be used for foodservice items and lunch trays for school. The material may be a reduced density biodegradable polymer. The reduced polymer may be composed primarily of PLA, and may have a cross-sectional structure that may or may not include skins. The internal structure may be mono-cellular, may have mixed cells of different sizes, or may have a layered structure.

Figure 19:
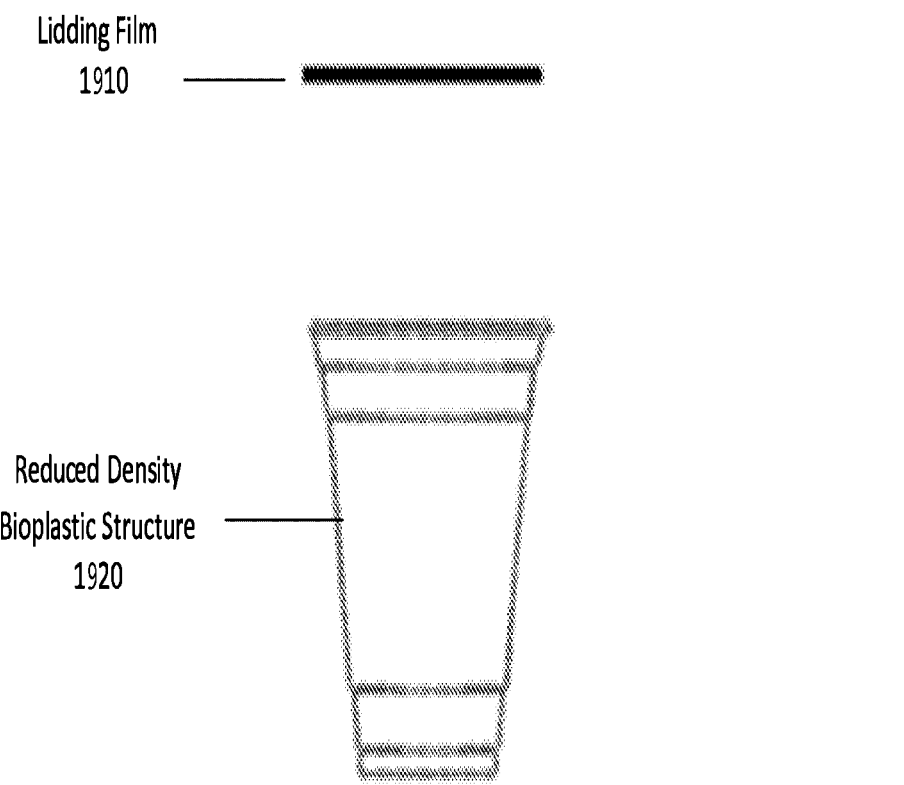
FIG. 19 illustrates one embodiment of a shaped object and lid produced from low-density thermoplastic structures.

FIG. 19 illustrates a shaped object and lid produced from low-density thermoplastic structures, according to one embodiment. Reduced Density Bioplastic Structure 1920 may be an object such as Deep Draw Object 1810 (such as a drink cup), Mid-Draw Object 1820 (such as a soup bowl), and Shallow Draw Object 1830 (such as a plate). Lidding Film 1910 may be a foil, a conventional polymer, or a compostable material. Both Lidding Film 1910 and Reduced Density Bioplastic Structure 1920 may be of a composite material that has a high resistance to the passage of oxygen and/or moisture, or include a barrier coating or treatment on their interior or exterior surface which may increase resistance to the passage of oxygen and/or moisture. Lidding Film 1910 may be attached to Reduced Density Bioplastic Structure 1920 by mechanical means or adhesive. The adhesive and barrier coating or treatment may be compostable. For example, heat setting compostable adhesives are available from 3M®. An example compostable film that may be included in this structure is Natureflex® produced by Innovia Films. Barrier coatings have also been produced by spraying a bonding agent and clay particles to the surface of a package. The clay particles create a tortuous path for molecules to pass through, increasing the barrier properties of containers.

Lidding Film 1910 and Reduced Density Bioplastic Structure 1920 may be a reduced density structure that incorporate a solid barrier layer included in a layered reduced density structure. One embodiment of this may be shown in FIG. 1, in which the solid core may be a barrier layer. The polymer blank for this structure may be generated through a multi-layer extrusion process including a barrier layer.

One application of this structure may be in the field of single service beverage pods, such as those sold by Keurig®. The structure described above may include a filter element and be partially filled with coffee or another food substance. All elements and adhesives of the created object may be compostable.

Another application of this structure is in food service items in general. Example applications include dairy containers, containers used for soups, or noodle containers.

A reduced density thermoplastic structure may also provide a clear lid. The lid may snap onto or adhere to the container. In order to provide a thermally-resistant compostable structure, a crystalline lower structure, and a relatively amorphous clear lid may be used. The crystalline reduced-density thermoplastic structure may then support the lid at elevated temperatures.

Figure 20:
FIG. 20 illustrates shapes that may be useful in the application of low-density polymer objects.
Figure 20:
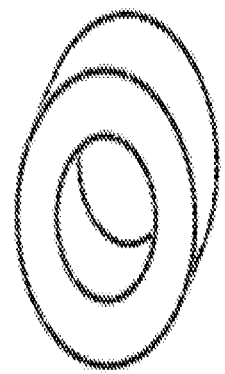
Figure 20:
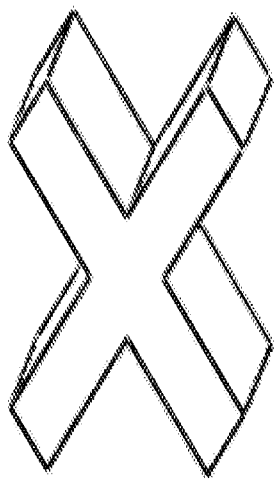

FIG. 20 illustrates shapes that may be useful in the application of low-density polymer objects. Reduced Density Polymer Shape 2010 is a shape that is similar to a packaging peanut. Reduced Density Polymer Shapes 2020, 2030 are other shapes that may be used as a packaging material.

These shapes may be generated, for example, by extruding a solid thermoplastic material, saturating it with high-pressure gas, and heating the resulting saturated polymer. The cross-sectional structure of these shapes may resemble Layered Structure as described above. The starting material may be bioplastic and/or compostable structures.

It may be useful to perform rapid saturation techniques in generating these shapes, starting with a shape that may be amorphous through most of its cross section and having crystallinity induced only at its surface during the saturation step. The shape may then be foamed in a heater for a long period of time, for example, one minute, allowing the entire core to foam. The crystallinity of the samples may be increased by heating and stretching to the point of the parts being stable over 65° C., which may allow shipping without refrigeration.

It may be efficient to batch foam these shapes, creating small pellet-like objects with the cross sections shown above, and feeding them through a pressure vessel in a series of locks. This may enable the continuous generation of packaging materials at relatively low cost. These shapes, or spheres, may be bonded or heat-fused together to generate shapes with complex geometries such as drink cups.

Figure 21:
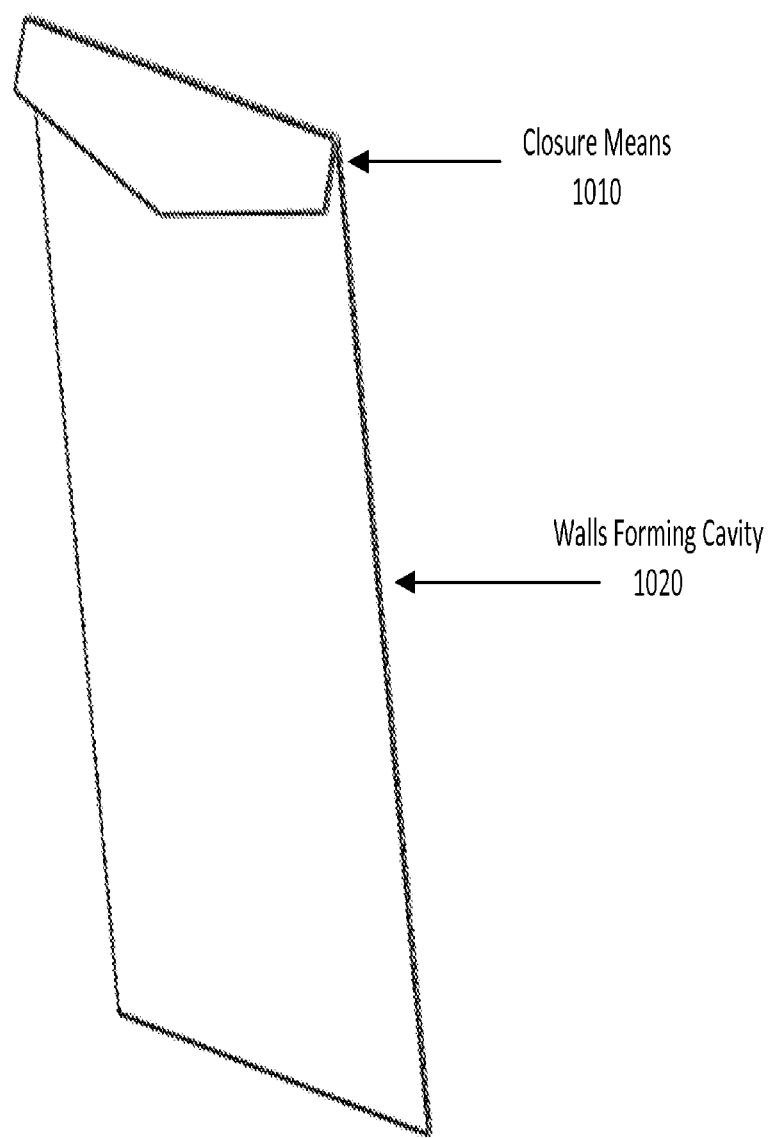
FIG. 21 illustrates an embodiment of a package that may be generated from reduced density film or panel.

FIG. 21 illustrates an embodiment of a package that may be generated from Panel 1710. The reduced density in both of these structures may service to reduce the cost of shipping the package, while the cellular structure may provide cushioning to the contents of the package. Closure Means 2110 may be, for example, a moistenable glue, a clasp, a "peel and seal" closure, or any other means known in the industry. Walls Forming Cavity 2120 may provide a volume suitable for inserting papers or other objects.

Combining elements from each of the above groups of figures may be used to generate products. An example may be to generate a polymer blank from a blend of biodegradable thermoplastics and biodegradable elongated fillers, saturate it in a continuous saturation device, and heat while stretching. This may yield a film that may be biodegradable and stable at high temperatures.

Another embodiment of the invention is a structure generated from a blank composed of biodegradable polymer sheet with a starting thickness of 0.012-0.040" inches. The biodegradable polymer sheet may be PLA, PLA with crystallizers, PLA with fillers, or a blend of biodegradable polymers. The blank may be saturated with high-pressure carbon dioxide or another gas and possibly a solvent using rapid saturation techniques, for example, 900 PSI for 3 minutes including water vapor. The sheet may be heated in a bath with a temperature exceeding 70° C. for at least 5 seconds, for example, 99° C. for 45 seconds. The sheet may then be used as a component or thermoformed into a shape for use using a mold at temperatures below 70° C. and preferably 25° C. in order to allow rapid cycle times. The saturated sheet may also be thermoformed in a masking thermoformer with a mold with a temperature over 70° C., in order to induce crystallization in a shape and induce further foaming.

Another embodiment may be a foam film or panel with a relative density of 5-70 percent of that of solid PLA, and a thickness of 0.004 to 0.120 inches in thickness. The thin film may be generated by stretching during foaming. The reduced density film may include fillers, particularly additives which can be used to extend the polymer chains in PLA.

Figure 22:
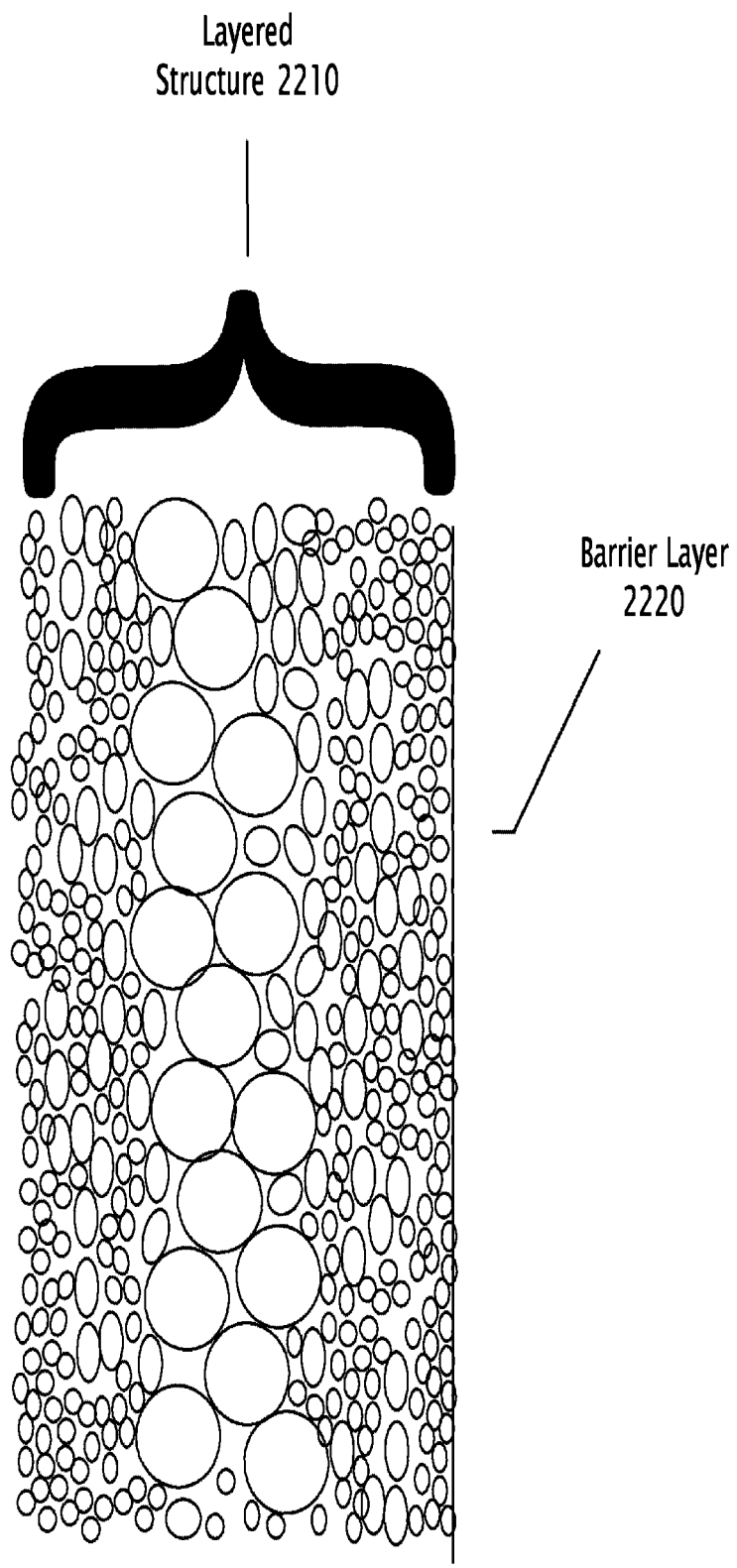
FIG. 22 illustrates an embodiment of a layered structure with an added barrier coating.

FIG. 22 illustrates one embodiment of Layered Structure in low-density thermoplastics. In this embodiment, Barrier Layer 2220 has been applied to a single side of Layered Structure 2210. Barrier Layer 2220 may be applied in the foam of a spray or laminated layer. Sprays including a polymer substrate and small particles of clay have been found to be effective as barrier layers through a mechanism of creating a "tortuous path" for oxygen, moisture, or other molecules to travel through a cross section of the material.

Layered Structure 2210 with applied Barrier Layer 2220 may improve performance of packaging for a given cost. Reducing the density of a structure generally lowers products costs and environmental impact. A layered structure may provide superior print quality, and impact and scratch resistance when compared to traditional foaming technologies. Barrier Layer 2220 may also protect packaging contents from undesirable chemical contact.

Figure 23:
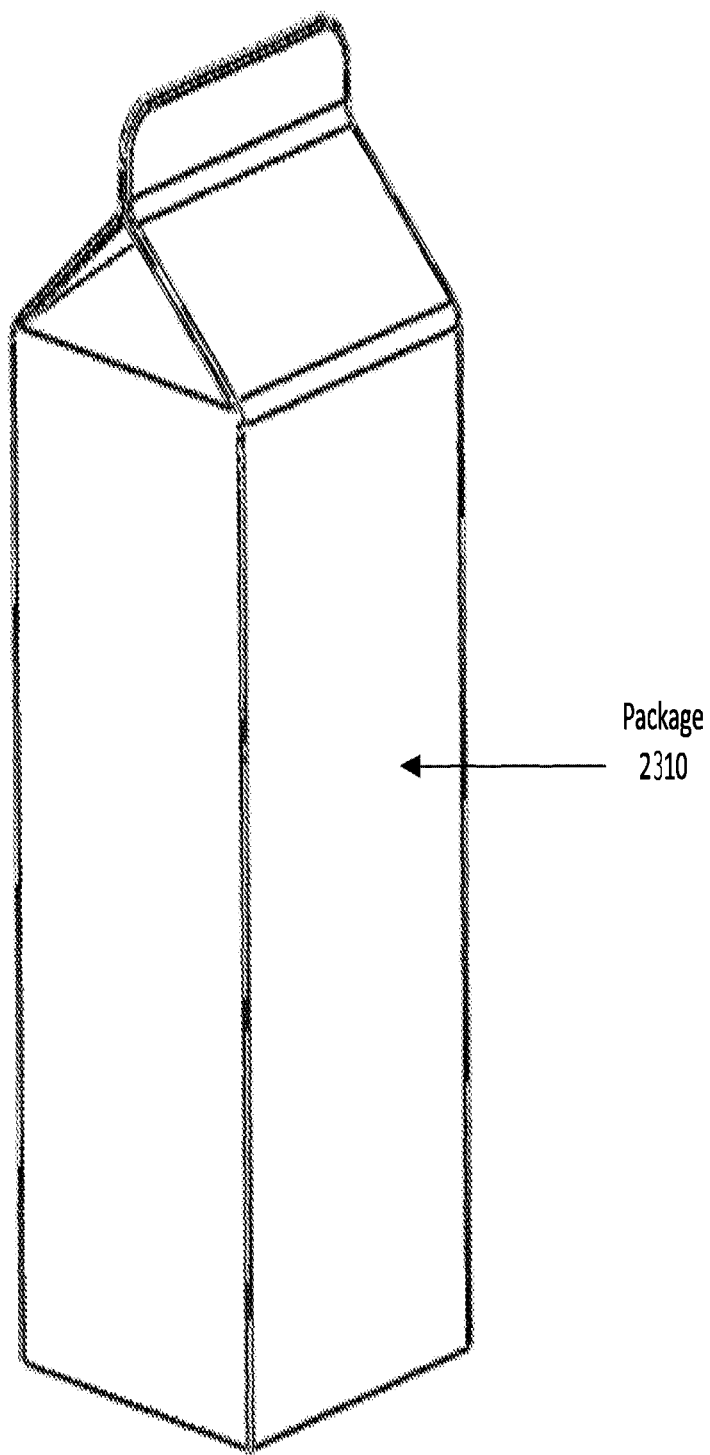
FIG. 23 illustrates an embodiment of a package that may be generated from a panel, through the folding of the panel and bonding of surfaces.

FIG. 23 illustrates an embodiment of Package 2310 that may be generated from Panel 1710, through the folding of the panel and bonding of surfaces. Package 2310 may be used to dispense liquid or solid items.

It may be recognized that many variations of packages may be produced from folding of a Panel 1710 in a manner similar to those that are used to produce products using paper and cardboard. These include a variety of paper, packages, and cartons, including, for example, paper coffee cups. It may be beneficial to directly heat-form a screw-type opening and accompanying lid into the wall of the container, or bond a separately formed screw-type opening in order to allow repeated opening and closing. It may also be helpful to generate a semi-rigid pouch using these methods, with a press-to-seal enclosure method commonly used on sandwich bags.

Plastic sheet is often extruded with a release layer on one or both sides of a sheet, so that a roll can be generated that does not stick to itself. It may be possible to generate containers or pouches by orienting sheet in a manner such that the non-release coated sides may be heat sealed together.

Figure 24:
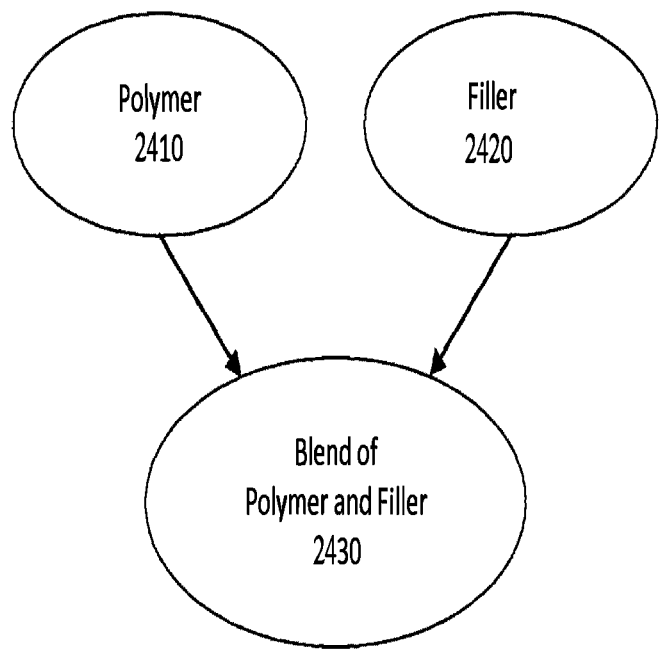
FIG. 24 is a flow diagram for generating blends of polymer and filler.

FIG. 24 is a block diagram for creating a polymer blank, according to one embodiment. A biodegradable polymer such as PLA may be combined with a solid filler and/or additive. The base polymer may be PLA or a combination of polymers that result in a Polymer 2410. Filler 2420 may be talc, algae, wood pulp, starch, or another solid filler that is biodegradable or does not interfere with degradation. A material may be chosen that is less expensive than the Biodegradable Polymer to reduce the cost of the end products. A Blend of Polymer and Filler 2430 may result. This may yield a composite structure that is shaped, of low density, and low cost.

In another embodiment, Filler 2430 may be elongated, and may include glass fibers, wood fibers, or another material with an aspect ratio of greater than 1:1.5. Elongated fillers may increase rigidity of the end product, which may be useful at elevated temperatures, where many biodegradable thermoplastic polymers become soft. A thermally stable composite 2430 may result.

In yet another embodiment, a polylactic acid polymer may combine with a biodegradable polymer filler to create a compostable polymer blend. Polylactic acid has limited performance in terms of temperature resistance, and additional characteristics may be desirable for some applications. Compostable filler may lend a "papery" feel, and provide identification of the product to consumers. For example, talc of 1-30% concentration by weight may be effective.

Combining PLA with a more rapidly degrading polymer or additive may lead to a product that degrades more rapidly, or in more varied environments than neat PLA. PLA/thermoplastic starch, or PLA/Polybutyl Succinate (PBS) blend may exhibit more rapid degradation than neat PLA. PBS/PLA blends, with greater than 30% PBS, have been demonstrated to exhibit higher service temperature than neat PLA. Polyhydroxyalkanoate blends with PLA may exhibit a lower environmental impact than pure PLA, and increased rates of degradation. PLA blended with a mix of at least one-half percent Polycaprolactone by weight may exhibit more rapid degradation, in a wider array of conditions, than pure PLA. PLA blended with an enzymatic and oxo-degradation agent, such as those sold by Earth Nurture or EPI, may result in a plant-based blend that degrades in a wide variety of environments.

In yet another embodiment, solid fillers may be added to a biodegradable plastic in a foaming process. Solid fillers may be particulate, including talc, or may include elongated fillers. This structure may have bubbles with a uniform cellular density, may include one or two skins on its surface, and may have cellular and/or crystallinity gradient. Incorporating solid fillers in quantities over 5% by weight may reduce the cost of a panel.

The incorporation of bactericide may result in a product with resistance to bacteria growth, which may be useful in foodservice applications. The incorporation of fertilizer may be useful in agricultural applications, in which a plant container may help nourish the plant which it holds. In seed starter applications, a seed may be planted in a fertilizing container; the seed starter and plant may then be planted together, creating a system in which the plant is nourished by the degrading pot. Crystallizing additives may be useful in creating semi-crystalline polymers that withstand higher temperatures. It may be desirable to incorporate a filler material that increases diffusion through the polymer, including small tubular structures and porous filler materials, in order to allow more rapid saturation. A chemical sizing may be added to the filler, or the surface of the materials chosen, in order to create micro-channels around the filler to increase saturation rates.

While the detailed description above has been expressed in terms of specific examples, those skilled in the art will appreciate that many other configurations could be used.

Accordingly, it will be appreciated that various equivalent modifications and combinations of the above-described embodiments may be made without departing from the spirit and scope of the invention.

The foregoing description of various embodiments of the invention has been presented for the purposes of illustration and description. It is not intended to be exhaustive or to limit the invention to the precise form disclosed. It is intended that the scope of the invention be limited not by this detailed description, but rather by the claims appended hereto. The above specification, examples and data provide a complete description of the manufacture and use of the invention. Since many embodiments of the invention may be made without departing from the spirit and scope of the invention, the invention resides in the claims hereinafter appended.

The invention claimed is:

1. An article, comprising:
a non-laminated polymer sheet including at least 60% by weight of a polylactic acid polymer material, the non-laminated polymer sheet having a first outer region, a second outer region, and an inner region disposed between the first outer region and the second outer region,
the first outer region and the second outer region including cells having a first average dimension, and
the inner region including elongated cells having a second average dimension, the second average dimension greater than the first dimension, wherein the elongated cells have a length to width aspect ratio of at least 3:1, and
wherein the cells in the first outer region, the second outer region, and the inner region are formed by heating the non-laminated polymer sheet after the non-laminated polymer sheet has been exposed to a gas at a pressure of at least 500 PSI for a predetermined time period less than 15 minutes, the predetermined time period sufficient to at least partially saturate the non-laminated polymer sheet with the gas.

2. The article of claim 1, wherein the non-laminated polymer sheet withstands deformation when at least one of the first outer region and the second outer region are exposed to a temperature of at least 180° F.

3. The article of claim 1, wherein the first average dimension is 50 micrometers or less.

4. The article of claim 1, wherein the second average dimension is at least 51 micrometers.

5. The article of claim 1, wherein the non-laminated polymer sheet is heated for a period of 15 to 60 seconds after being exposed to the gas.

6. The article of claim 1, wherein the first outer region and the second outer region have a higher level of crystallinity than the inner region.

7. The article of claim 1, further comprising:
an additive.

8. The article of claim 7, wherein the additive is a crystallizing additive.

9. The article of claim 7, wherein the additive is selected from the group consisting of polybutyl succinate, polycaprolactone and polyhydroxyalkanoate.

10. The article of claim 1, wherein the non-laminated polymer sheet includes filler.

11. The article of 10, wherein the filler is a biodegradable filler selected from the group consisting of talc, algae, wood pulp, and starch.

12. The article of claim 1, further comprising:
a skin disposed on at least one of the first outer region and the second outer region.

13. The article of claim 1, further comprising:
a coating disposed on at least one of the first outer region and the second outer region.

14. The article of claim 1, further comprising:
a solid core disposed in the inner region.

15. The article of claim 1, wherein the non-laminated polymer sheet is a non-planar formed shape.

* * * * *